United States Patent
Bonner et al.

(10) Patent No.: US 8,298,657 B2
(45) Date of Patent: Oct. 30, 2012

(54) POROUS INTERPENETRATING POLYMER NETWORK

(76) Inventors: Alex Garfield Bonner, Lexington, MA (US); Lawrence Udell, Needham, MA (US); David Wells Andrews, Amesbury, MA (US); Fu-Jya Daniel Tsai, Alpharetta, GA (US); Gaston De Los Reyes, Somerville, MA (US)

( * ) Notice: Subject to any disclaimer, the term of this patent is extended or adjusted under 35 U.S.C. 154(b) by 1 day.

(21) Appl. No.: 13/101,194

(22) Filed: May 5, 2011
(Under 37 CFR 1.47)

(65) Prior Publication Data
US 2011/0217539 A1 Sep. 8, 2011

Related U.S. Application Data

(63) Continuation of application No. PCT/US2010/024804, filed on Feb. 19, 2010.

(60) Provisional application No. 61/153,790, filed on Feb. 19, 2009.

(51) Int. Cl.
*B32B 3/00* (2006.01)
*B29C 44/12* (2006.01)
*B05B 3/00* (2006.01)
*D21F 11/00* (2006.01)

(52) U.S. Cl. ...... 428/314.2; 264/28; 264/45.3; 162/141; 162/146

(58) Field of Classification Search ............ None
See application file for complete search history.

(56) References Cited

U.S. PATENT DOCUMENTS

| | | |
|---|---|---|
| 3,281,409 A | 10/1966 | Blethen |
| 3,335,127 A | 8/1967 | Polson |
| 3,423,396 A | 1/1969 | Zabin |
| 3,507,851 A | 4/1970 | Ghetie et al. |
| 3,527,712 A | 9/1970 | Renn et al. |
| 3,956,273 A | 5/1976 | Guiseley |
| 4,275,196 A | 6/1981 | Shainoff |

(Continued)

FOREIGN PATENT DOCUMENTS

WO    WO03093337 A1    11/2003

(Continued)

OTHER PUBLICATIONS

Y. Liu and M.B.Chan-Park, Biomaterials 20 (2009) 196-207. Hydrogel based on interpenetrating polymer networks of dextran and gelatin for vascular tissue engineering.

(Continued)

*Primary Examiner* — Camie Thompson
(74) *Attorney, Agent, or Firm* — Sonja K. Guterman; Sanjeev K. Mahanta; Barry Gaiman

(57) ABSTRACT

A functional, porous, interpenetrating polymer network (IPN) includes a first polymer network in the form of a porogenic support fabric (PSF) composed of linear polymers in the form of a pre-formed network comprising a fibrous composite and a second polymer network synthesized, gelated, and/or cross-linked in the presence of the first polymer network to form a system of polymers which have their respective chains held in place by means of permanent physical entanglements produced by the interweaving of the component polymer networks. The IPN is modified by dissolving and dispersing a portion of the PSF fibers, the dispersible fiber network (DFN) to form a pre-designed interconnected pore structure. The resultant porous, supported, second polymer network has convective flow, diffusive flow, and high capacity, and may include functional capture chemistries to provide an adsorptive media for chromatography and filtration of various compounds including biomolecules.

22 Claims, 10 Drawing Sheets

U.S. PATENT DOCUMENTS

| | | | |
|---|---|---|---|
| 4,382,124 | A | 5/1983 | Meitzner et al. |
| 4,517,142 | A | 5/1985 | Baniel |
| 4,633,873 | A | 1/1987 | Dumican et al. |
| 4,728,394 | A | 3/1988 | Shinjou et al. |
| 4,761,232 | A | 8/1988 | Bright |
| 4,871,365 | A | 10/1989 | Dumican |
| 4,879,316 | A | 11/1989 | Alexandratos et al. |
| 4,963,261 | A | 10/1990 | Witkowski et al. |
| 5,009,759 | A | 4/1991 | Serwer et al. |
| 5,156,843 | A | 10/1992 | Leong et al. |
| 5,277,915 | A | 1/1994 | Provonchee et al. |
| 5,437,918 | A | 8/1995 | Taniguchi et al. |
| 5,500,068 | A | 3/1996 | Srinivasan et al. |
| 5,512,600 | A | 4/1996 | Mikos et al. |
| 5,593,778 | A | 1/1997 | Kondo et al. |
| 5,723,601 | A | 3/1998 | Larsson |
| 5,766,760 | A | 6/1998 | Tsai et al. |
| 5,783,504 | A | 7/1998 | Ehret et al. |
| 5,837,752 | A | 11/1998 | Shastri et al. |
| 5,916,678 | A | 6/1999 | Jackson et al. |
| 5,968,643 | A | 10/1999 | Topolkaraev et al. |
| 5,989,432 | A | 11/1999 | Gildersleeve et al. |
| 5,993,661 | A | 11/1999 | Ruckenstein et al. |
| 6,060,530 | A | 5/2000 | Chaouk et al. |
| 6,201,068 | B1 | 3/2001 | Tsai et al. |
| 6,258,276 | B1 | 7/2001 | Mika et al. |
| 6,472,219 | B1 | 10/2002 | Nieuwenhuis et al. |
| 6,562,573 | B2 | 5/2003 | Halaka |
| 6,652,966 | B1 * | 11/2003 | Hin et al. ............. 428/370 |
| 6,783,937 | B1 | 8/2004 | Hou et al. |
| 6,827,743 | B2 * | 12/2004 | Eisermann et al. ....... 623/23.54 |
| 6,897,271 | B1 | 5/2005 | Domschke et al. |
| 7,022,632 | B2 | 4/2006 | Hatta et al. |
| 7,048,856 | B2 | 5/2006 | Fissell, IV et al. |
| 7,048,885 | B2 | 5/2006 | Weiher et al. |
| 7,056,957 | B2 | 6/2006 | Omidian et al. |
| 7,074,510 | B2 | 7/2006 | Rhee et al. |
| 7,192,604 | B2 | 3/2007 | Brown et al. |
| 7,265,188 | B2 | 9/2007 | Autran |
| 7,316,919 | B2 | 1/2008 | Childs et al. |
| 7,326,659 | B2 | 2/2008 | Cederblad et al. |
| 7,381,331 | B2 | 6/2008 | Duong et al. |
| 7,396,467 | B2 | 7/2008 | Berg et al. |
| 7,479,222 | B2 | 1/2009 | DiLeo et al. |
| 7,479,223 | B2 | 1/2009 | DiLeo et al. |
| 2001/0038831 | A1 | 11/2001 | Park et al. |
| 2003/0082808 | A1 | 5/2003 | Guan et al. |
| 2004/0203149 | A1 | 10/2004 | Childs et al. |
| 2004/0234571 | A1 | 11/2004 | Jang |
| 2005/0011826 | A1 | 1/2005 | Childs et al. |
| 2005/0220982 | A1 | 10/2005 | Moya et al. |
| 2006/0121217 | A1 | 6/2006 | Childs et al. |
| 2007/0069408 | A1 | 3/2007 | Cheng et al. |
| 2007/0138084 | A1 | 6/2007 | Galvin et al. |
| 2008/0020142 | A1 * | 1/2008 | Feng et al. ............. 427/342 |
| 2008/0070454 | A1 | 3/2008 | Chang |
| 2008/0154031 | A1 | 6/2008 | Berg et al. |
| 2008/0213645 | A1 * | 9/2008 | Akita ................. 429/33 |
| 2008/0237133 | A1 | 10/2008 | Dale et al. |
| 2008/0317818 | A1 * | 12/2008 | Griffith et al. ........ 424/427 |

FOREIGN PATENT DOCUMENTS

| | | | |
|---|---|---|---|
| WO | WO2004073843 | A1 | 9/2004 |
| WO | WO2005097304 | A1 | 10/2005 |
| WO | WO2005120701 | A1 | 12/2005 |
| WO | WO2007004947 | A1 | 1/2007 |

OTHER PUBLICATIONS

S.J.Kim, S.J.Park, and S.I.Kim, Reactive and Functional Polymers 55 (2003) 53-59. Swelling behavior of interpenetrating polymer network hydrogels composed of poly(vinyl alcohol) and chitosan.

M.Akay and S.N. Rollins, Polymer 34 (1993) 1865-1873. Polyurethane-poly(methyl methacrylate) interpenetrating polymer networks.

A.Medin and J-C. Janson, Carbohydrate Polymers 22 (1993) 127-136. Studies on aqueous polymer two-phase systems containing agarose.

R.B.Garcia, R.R.L.Vidal, and M.Rinaudo, Polimeros: Ciencia e Tecnologiz 10 (2000) 155-161. Preparation and Structural Characterization of O-Acetyl Agarose with Low Degree of Substitution.

G.Ohman and D.Grande, Macromol.Symp. 267 (2008) 21-26. Mesoporous Polymeric Materials Tailored from Oligoester-Derivatized Interpenetrating Polymer Networks.

P-E.Gustavsson, and P-O Larsson, J.Chromatog.A. 734 (1996) 231-240. Superporous agarose, a new material for chromatography.

P-E Gustavsson, K. Mosbach, K.Nilsson, and P-O Larsson, J.Chromatog. A, 776 (1997) 197-203. Superporous agarose as an affinity chromatography support.

P-E. Gustayzsson, A.Axelsson and P-O Larsson, J.Chromatog.A, 795 (1998) 199-210. Direct measurements of convective fluid velocities in superporous agarose beads.

E.Palsson, A-L.Smeds, A.Petersson, and P-O. Larsson, J.Chromatog. A.840 (1999) 39-50. Faster isolation of recombinant factor VIII SQ with a superporous agarose matrix.

P-E.Gustavsson and P-O Larsson, J.Chromatog A, 832(1999)29-39. Continuous superporous agarose beds for chromatography and electrophoresis.

P-E.Gustavsson, A.Axelsson, and P-O Larsson, J.Chromatog A, 830(1999)275-284. Superporous agarose beads as a hydrophobic interaction chromatography support.

M.P.Nandakumar, E.Palsson, P-E. Gustavsson, P-O. Larsson and B.Mattiasson, Bioseparation 9 (2000) 193-202. Superporous agarose monoliths as mini-reactors in flow injection systems.

P-E.Gustavsson and P-O.Larsson, J. Chromatog. A. 925(2001)69-78. Continuous superporous agarose beds in radial flow columns.

I.Gottschalk, P-E.Gustavsson, B.Ersson, and P.Lundahl, J.Chromatog. B, 784 (2003) 203-208. Improved lectin-mediated immobilization of human red blood cells in superporous agarose beads.

P.Tiainen, P-E.Bustavsson, A.Ljunglof, and P-O.Larsson, J.Chromatog. A, 1138(2007)84-94. Superporous agarose anion exchangers for plasmid isolation.

D.Albrecht, V.L.Tsang, R.L.Sah, and S.Bhatia, Lab Chip 5 (2005) 111-118. Photo- and electropatterning of hydrogel-encapsulated living cell arrays.

J.Curling, BioPharm Intl. Feb. 2, 2007, History of Chromatography:Process Chromatography:Five Decades of Innovation.

M.Jacoby, Chem.Eng.News 84(2006)14-19. Monolithic Chromatography:Nontraditional col. materials improve separations of biomixtures.

R.B.Provonchee, T.C.Willis, and F.H.Kirkpatrick, Biophysical J. 57(1990) 380a. Gel-In-Matrix: A New Method for Immobilization and Extraction.

News article re Hillmyer and Multifunctional Membranes, CEN-Online.org, pp. 23, Jan. 3, 2011.

W.Guo, and E.Ruckenstein, J.Membrane Sci. 182 (2001)227-234. A new matrix for membrane affinity chromatography and its application to the purification of concanavalin A.

J.M.Moran, D.PPazzano, and L.J.Bonassar, Tissue Engineering 9 (2003) 63-70. Characterization of Polylactic Acid-Polyglycolic Acid Composites for Cartilage Tissue Engineering.

H.Hanot, Am.Biotech.Lab 25 (2007) 24-26, Use of High-Technology Track-Etched Polymer Membranes in a Wide Range of Industries.

D.C.Sherrington, Chem Commun., (1998) 2275-2286. Preparation, structure and morphology of polymer supports.

E.Gregor, Water Conditioning & Purification, Feb. 2008., Membrane Support Fabrics: Issues and Un-Met Needs.

IUPAC Compendium of Chemical Terminology, The Gold Book, 2nd Ed., A.D. McNaught and A. Wilkinson, Blackwell Science, 1977.

D.Grande, G.Rohman and M-C. Millot, Polymer Bulletin 61 (2008) 129-135. Nanoporous networks derived from functional semi-Interpenetrating Polymer Networks: Preparation and use as ion-exchange chromatographic supports.

G.Rohman, F.Laupretre, S.Boileau, P.Guerin, and D.Grande, Polymer 48 (2007) 7017-7028. Poly(D,L-lactide/poly (methyl methacrylate) interpenetrating polymer networks : Synthesis, characterization, and use as precursors to porous polymeric materials.

G. Rohman, D Grande, F. Laupretre, S. Boileau, and P. Guerin, Macromol. 38 (2005) 7274-7285. Design of Porous Polymeric Materials from Interpenetrating Polymer Networks (IPNs) : Poly(DL-lactide)/Poly(methyl methacrylate)-Based Semi-IPN Systems.

R. Balaji, S. Boileau, P. Guerin, and D. Grande, Polymer News 29 (2004) 2005-212. Design of Porous Polymeric Materials from Miscellaneous Macromolecular Architectures : An Overview.

E.M. del Valle, M.A.G. Serrano, and R.L. Cerro, Biotechnol Prog 19 (2003) 921-927. Use of Ceramic Monoliths as Stationary Phase in Affinity Chromatography.

Sundberg and Porath, 1974, J. Chromatography 90, 87-98. Preparation of Adsorbents for Bioaffinity Chromatography.

Guisan, J.M., et al., in Methods in Biotechnology, Series Ed. J.M. Walker, Immobilization of Enzymes and Cells, ed. G. F. Bickerstaff, 1997, Humana Press, Totowa, NJ., 277-287. Immobilization of Enzymes on Glyoxal Agarose.

Lane, C.F., 1976, Synthesis 3 (1975)135-146. Sodium Cyanoborohydride—A Highly Selective Reducing Agent for Organic Functional Groups.

Guisan, J.M., et al., Enzyme Micro. Technol., 11 (1989) 353-359. Immobilization-stabilization of enzymes; variables that control the intensity of the trypsin (amine)—agarose (aldehyde) multipoint attachment.

* cited by examiner

POROUS INTERPENETRATING POLYMER NETWORK

RELATED PATENT APPLICATIONS

This application claims the benefit of the filing date of: International application having Ser. No. PCT/US2010/024804 entitled "Porous Interpenetrating Polymer Network" filed Feb. 19, 2010 which claims the benefit of earlier filed U.S. Provisional Patent Application having Ser. No. 61/153,790 entitled "Porous Interpenetrating Polymer Networks with Improved Properties," filed Feb. 19, 2009 that shares co-inventorship with the present application. The entire teachings and contents of these Patent Applications are hereby incorporated by reference herein in their entireties.

STATEMENT OF FEDERALLY SPONSORED RESEARCH

This invention was made with government support under Grant Number RGM-072941 awarded by the National Institutes of Health. The government has certain rights in the invention.

BACKGROUND OF THE INVENTION

Related art and background information are discussed below in regard to membranes, membrane support fabrics, porogens, interpenetrating polymer networks, degradable fabrics, polysaccharides, and chromatography.

Thin materials of natural or synthetic composition which are permeable to fluids are commonly referred to as membranes. Typically, synthetic membranes are composite materials which are formed by casting, coating, or impregnating a polymeric solution onto a support substrate known as a membrane support fabric. In this manner, a polymer is applied to a supporting material, permeability is determined by intrinsic properties of the polymer and/or by use of porogens, and the resulting materials are used for filtration, chromatography, controlled drug release, etc.

Other applications of these materials are as integral components in devices for medical diagnostics, devices for medical therapeutics such as wound dressings, infection control, drug delivery, cell therapy, and in industrial applications related to food and beverage processing. Furthermore, there are applications in research products involved in the processing of samples for purposes of drug discovery and related laboratory operations for the purpose of generating information.

Numerous techniques are used for generation of the membrane pore structure. Common synthetic strategies rely on the use of porogens such as solvents or gases added to the polymer forming solution for the purpose of creating pores by physically or chemically induced phase separation and the microstructure of the resulting materials is generally characterized by a broad pore size distribution. In addition, approaches using porogen templates have been developed and such templates are able to induce specific structural pores within the residual structures. These templates can be small molecules, macromolecules, or polymeric structures depending on the desired pore structure. Another method for generating porous materials relies on the use of interpenetrating polymer networks (IPN) which are partially degradable and in which the pore structure is created by selective degradation of one of the polymers.

Membranes. Filtration membranes are highly efficient polymeric media for sub-micron separation tasks. Due to their fragile nature, the polymeric materials often need physical support for better handling or to withstand the operation conditions of the end use application. Accordingly, woven and nonwoven fabrics are commonly used for membrane casting, membrane lamination, and pleat support/drainage layers. In this manner, a membrane is prepared with characteristics suitable for microfiltration, ultrafiltration, or as a reverse osmosis membrane in flat sheet, spiral, or tubular filter configurations. An example is U.S. Pat. No. 7,316,919 which describes composite materials comprising supported macroporous gels and teaches that macroporous gels can be supported by a "support member" such that the macroporous gel fills the pores of the support laterally i.e. substantially perpendicular to the flow through the composite material and that the support member can be a fibrous nonwoven. The methods discussed in this patent for making these membranes involve complicated chemistry, hazardous solvents, and unreliable mechanical methods which result in low reproducibility and unpredictable permeability characteristics.

Membrane Support Fabrics. Membranes are constructed from highly engineered compounds using wet cast, polymeric materials such as poly(vinylidene difluoride), cellulose acetate, polyether sulfone, polyacrylamide, etc. During manufacture, the polymer compound is cast throughout or onto one side of a fabric support structure onto which a polymer is formed (E. Gregor, 'Membrane Support Fabrics', Water Conditioning & Purif. 50 (2008)). The thin membrane fabric substrate (or support) includes a nonwoven or woven, fabric. Its purpose is to provide a support material which can be fully or partially impregnated with a polymer forming solution as well as dimensional stability, strength, tear resistance, durability, and thereby allowing for processing into sheet-form or spiral wound modules.

The majority of membrane support fabrics utilize a polyester fabric as the base substrate, whereas polypropylene fabric substrates are used when chemical resistance is essential. The typical membrane support fabric is constructed as a wet-laid nonwoven fabric, whether polyester or polypropylene. Air-laid nonwovens, spunbond nonwovens, meltblown nonwovens and woven fabrics have been used as membrane support fabrics but wet-laid nonwovens are more uniform and consistent and are more commonly used for membrane manufacture. Examples are as follows:

U.S. Pat. Nos. 4,728,394 and 4,795,559 disclose a nonwoven support layer for casting semi-permeable membranes comprising a laminate of a low density layer made entirely from air-laid or carded polyester fibers containing 20 to 80% undrawn polyester or bicomponent polyester fibers, and a high density layer.

U.S. Pat. No. 5,989,432 discloses a composite membrane including a semi-permeable membrane, a support layer and a nonwoven web of multi-component fibers wherein the multi-component fibers comprise a first polymer as the core component and a second polymer on the surface of the fibers, the second polymer having a softening temperature below the softening temperatures of the first polymer, the membrane and the support layer.

U.S. Pat. No. 7,048,885 discloses an asymmetric nonwoven support layer having a microporous casting layer having a mean pore size no greater than about 300 micrometers on the surface thereof for casting semi-permeable membranes, the casting layer formed by heat treating, calendering, melt-blowing or wet-laying a layer of fibers.

U.S. Patent Application No. 2007/0138084 discloses a multilayer, membrane support fabric designed to permit a polymer forming solution to penetrate to a controlled depth without penetrating through the entire thickness of the fabric.

Porogens. Porosity is a measure of the void space in a material. Porosity is generally referred to as the void fraction or void volume and is typically reported as a value between 0-100%. For polymeric materials including hydrocolloids and hydrogels, porosity is a combination of chemical properties of the polymer and the properties of the polymerization process including but not limited to the properties and amounts of solvents and other additives used during polymerization. As a result, the overall porosity of a polymeric material is a combination of the intrinsic pore structure of the polymeric matrix and process related phenomena such as polymerization in the presence of inert components (solid, liquid or gas) commonly referred to as porogens, and phenomena such as solvent induced phase separation during polymerization, or processes that affect the polymer after formation such as mechanical fracturing or hole punching.

There are other methods for the manufacture of porous polymers involving the polymerization of a polymerizable component in the presence of an inert material referred to as a porogen. Subsequent leaching of insoluble porogens gives rise to interstices throughout the formed polymer material. However, these methods are usually complicated by extensive extraction procedures necessary for complete removal of the conventionally used porogens. A further disadvantage of these methods is the difficulty of stabilizing the suspension of porogen in the polymerization mixture. Another disadvantage of existing methods is that trace amounts of a miscible or immiscible porogen can affect the final or natural ultrastructure of the polymer in an unpredictable manner. Also, unstable suspensions can lead to a non-homogeneous and unacceptable product. In many cases, extensive optimization of the viscosity of the system and the type of porogen is needed to obtain a satisfactory and reproducible result. Also, existing procedures are limited in terms of the availability of porogens suitable for introducing the desired ranges of pore sizes. Furthermore, existing types of conventional, inert porogens lead to a broad pore size distribution and they require labor intensive and time consuming experimentation and optimization in order to obtain a useful material. Indeed, the pore size of polymers and hydrogels prepared by these porogen techniques depend on the size and/or concentration of the porogen but results are not predictable. Also, the introduction of a porogen reduces the mechanical strength significantly and the presence of large and variable sized pores will make the porous materials extremely weak.

Interpenetrating Polymer Networks (IPN). IPN's are generally defined (see IUPAC Compendium of Chemical Terminology, The Gold Book, $2^{nd}$ Ed., A. D. McNaught and A. Wilkinson, Blackwell Science, 1977) as a combination of two independent polymers in a network form, at least one of which has been synthesized in the presence of the other. These complex polymer structures are of particular interest when they include two components with contrasted degradability under specific conditions. Accordingly, porous materials can be generated from such IPN's by resorting to selective degradation methods. However, by definition the polymer networks of an IPN are at least partially interlaced on a molecular scale and the IPN's reported in the literature are typically the result of intermixing two polymers on a molecular level. Hence, due to the normal molecular scale of the interlocking networks of interpenetrating polymer networks, macrophase segregation is prevented and the spatial scale of phase separation is restricted to hundredths or even tenths of nanometers. Thus, pore sizes created by this technique are restricted to hundredths or tenths of nanometers. In addition, IPN methods which rely on the intermixing of multiple reactants in a single phase result in changes to the intrinsic nature and pore structure of each polymeric component due to intermolecular interactions between the two or more partners and modified intramolecular interactions caused by the presence of one or the other polymer forming solutions. Examples are as follows:

U.S. Pat. No. 5,837,752 describes compositions for bone repair based on semi-interpenetrating polymer networks containing linear degradable polymers such as polyanhydrides and polyhydroxy acids.

U.S. Pat. No. 6,224,893 describes compositions for tissue engineering and drug delivery based on solutions of two or more polymers which form semi-interpenetrating or interpenetrating polymer networks.

U.S. Patent Application No. 2008/0237133 describes macroporous materials prepared from novel copolymers which can be made using an interpenetrating polymer network technique and having large pores typically in the range of 5,000 to 200,000 Angstroms. Preparations of porous materials from partially degradable interpenetrating polymer networks have been described in a number of publications. (Polymer Bulletin 61 (2008) 129-135, Polymer 48 (2007) 7017-7028, Macromolecules 38 (2005) 7274-7285, and Polymer News 29 (2004) 205-212). These publications describe the preparation of IPN's containing at least one degradable or dispersible polymer which, after removal by solvent or hydrolysis, results in a porous polymer product having typical pore sizes from 10-100 nanometers.

Degradable Fabrics. Fabrics and other materials composed of dispersible/degradable fibers are of particular interest for applications ranging from the common diaper to sophisticated medical applications such as scaffolds for in vitro and in vivo cell growth or organ implants. These materials typically utilize aliphatic polyester fibers which can be easily hydrolyzed and are based on alphahydroxyalkanoates such as polyglycolic acid (PGA) and polylactic acid (PLA). Also, other dispersible fiber materials such as polyvinylalcohol (PVA) and fiber based on lactides, lactones, carbonates and oxalates are commonly used when a dispersible or degradable fiber matrix is needed. Examples are as follows:

U.S. Pat. No. 4,633,873, and U.S. Pat. No. 4,871,365, describe a mesh or fabric made from adsorbable, partially adsorbable, or a mixture of adsorbable and non-adsorbable fibers and is a biodegradable fabric useful in surgical repair of soft tissue.

U.S. Pat. No. 5,092,884 describes a surgical composite structure with adsorbable and nonadsorbable components.

U.S. Pat. No. 5,437,918 describes a degradable nonwoven fabric and preparation process thereof.

U.S. Pat. No. 6,201,068 describes a biodegradable polylactide nonwoven material.

U.S. Pat. No. 7,265,188 relates to tough and ductile biodegradable, aliphatic polyester blend compositions and methods for preparing such compositions.

Polysaccharides.

U.S. Pat. No. 5,277,915 describes a gel-in-matrix composite including a three dimensional porous matrix, such as an open-cell foam, having within its matrix a mechanically-fractured hydrogel such as agarose and containing a network of fracture channels resultant from mechanically fracturing the gel.

U.S. Pat. No. 7,479,222 describes a porous adsorptive or chromatographic media comprised of a porous non-woven fabric with a coating of agarose that is about 1 micrometer to 40 micrometers thick.

U.S. Patent Application No. 2008/0154031 describes a method of preparing a separation matrix and specifically describes a method for preparing a particulate polysaccharide separation matrix such as agarose, which allows cross-linking with reduced risk of aggregation.

Chromatography. Chromatography is a general separation technique that uses the distribution of the molecules of interest between a functionalized stationary phase and a mobile phase for molecular separation. The stationary phase refers to a porous media and imbibed immobile solvent. Columns with associated end caps, fittings and tubing are the most common configuration, with the media packed into the tube or column. The mobile phase is pumped through the column. The sample is introduced at one end of the column, and the various components interact with the stationary phase and are adsorbed to or in the media or traverse the column at different velocities. The separated components are collected or detected at the other end of the column. Adsorbed components are released in a separate step by pumping an eluant solvent through the column. Chromatographic methods included among other methods, gel chromatography, ion exchange chromatography, hydrophobic interaction chromatography, reverse phase chromatography, affinity chromatography, immuno-adsorption chromatography, lectin affinity chromatography, ion affinity chromatography and other such well-known chromatographic methods. Current "state of the art" chromatographic or adsorptive separations use bead based, monolith or membrane media to accomplish the desired separation. These three technologies (beads, monoliths and membranes) accomplish separations via differing physical forms and therefore operate in phenomenologically different ways. A major difference between these three media is the relationship between the adsorbing surface (where adsorption of an entity to a ligand or ligands occurs) and the convective fluid flow.

Bead based media have convective flow occurring at the bead surface while most of the adsorbing surface is internal to the bead and can only be reached via diffusion. The convective fluid flow properties are determined by the bead size. Smaller beads require higher pressure to attain equivalent flow in a column. However, the equilibrium adsorbing capacity is not determined by the bead size. Therefore, the static capacity of the adsorbing surface and the flow properties of the materials are not necessarily coupled or interdependent. However, because most of the adsorbing capacity is accessed through diffusion, the dynamic binding capacity (capacity in a flow through mode at a given flow rate) is coupled to the bead size and therefore to the convective flow properties of the adsorbent. U.S. Pat. No. 6,428,707 describes adsorption/separation methods and a bead type media for adsorption/separation.

Typically in the area of chromatographic separations, polysaccharide polymers, such as agarose, are used to make gel media since agarose forms thermoreversible agarose gels in water at concentrations a low as 0.1%. To process agarose for example, dehydrated, amorphous agarose solid is suspended in water and heated to boiling at which point the agarose dissolves to form a homogeneous solution. The solution remains fluid and homogeneous as long as the temperature is above the gelling temperature, which is typically about 43° C. At and below the gelling temperature, a hydrogel is formed due to the formation of alpha-helical structures and other conformational changes in the agarose polymer matrix. The resultant gel takes on whatever shape the solution was just before gelling. Additionally, as the agarose approaches its gelling temperature, the viscosity of the solution becomes higher and higher as the hydrogel begins to form.

Traditionally, for the preparations of polysaccharide beads, such as those used in chromatography media, the heated solution is kept above its gel point and it is stirred into an immiscible, heated fluid, such as mineral or vegetable oil, to form beads in a well known process of suspension polymerization. The two phase material (beads of agarose in the immiscible fluid) is then cooled and the beads are recovered. The beads are diffusionally porous and can be used as made for size exclusion chromatography. Preferably, they are further processed by cross-linking, the addition of various capture chemistries such as affinity chemistries or ligands, positive or negative charge, hydrophobicity or combinations of cross-linking and chemistries to enhance their capture capabilities.

The beads are then loaded into a chromatography column forming a bed of media through which a fluid containing the material to be captured is passed. The beads are then washed to remove unbound contaminants and then the adsorbed, captured material is eluted from the beads and collected. Several problems exist with this type of media. The packing of the beads into a column is a difficult and laborious task. One needs to be sure that the column is properly packed so as to avoid channeling, bypass and blockages within the column. Packing of columns is time consuming and laborious. The use of beads limits the depth of the media in process applications because of the pressure that must be overcome. Excess pressure may compress the beads or require expensive pressure retaining components for the column. Softer beads tend to compress more than rigid beads. Compression is indicated by a steep increase in pressure drop across the bed at sufficiently high flow rates. High pressure drop is due to compression of the beads and subsequent reduction of void volume. The cumulative drag force of the flowing liquid through the bed causes higher pressure and results in compression of the beads. Drag force increases with higher flow rates, resulting in higher flow resistance and with bed height. One often needs to run a soft gel bead system at a slow rate in order to ensure that the pressure drop is within acceptable bounds and does not cause the beads to collapse and plug the column.

Other disadvantages to beaded supports for chromatography are the associated difficulties in manufacturing beads of uniform or similar size and composition. For example, agarose beads are commonly prepared by well known methods of suspension polymerization. In this process, a hot agarose solution is vigorously mixed with an inert, usually organic solvent in order to create a suspension of small particles. Then, after lowering the temperature of the mixture, the agarose particles gel and form mechanically stable beads. However, this commonly results in a distribution of bead sizes and subsequent mechanical separation techniques are employed in the manufacturing process in order to remove beads that are excessively large or small resulting in associated yield losses during the manufacturing process.

As the agarose beads are porous and the selected molecule to be captured must diffuse into the pores of the media to be adsorbed and captured, the speed and capacity of the system are diffusionally limited. There are two diffusional limitations, one surrounding the bead where a film of material may form and inhibit movement of the selected molecule to the surface of the bead and a second internal diffusional resistance which is determined by the size, number and length of the pores formed in the bead surface. Additionally, the permeability is related to bead size (which can vary widely) as well as the bead stability. Larger beads and beads with larger pores tend to have higher permeability. Beads that are not subject to or less subject to compression (by the weight of the beads above them coupled with the pressure under which the fluid flows through the bed) also tend to have greater permeability. However, at high flow rates, permeability decreases and dynamic capacity also decreases.

An alternative has been to use membrane or monolithic adsorbers which have a thin coating of a functional polymer such as agarose. One example of a surface functionalized monolith is taught by Cerro et al., Biotechnol. Prog 2003 (19) 921-927 (Use of ceramic monoliths as stationary phase in affinity chromatography), in which thin, surface-active only, agarose coatings on ceramic monoliths were created by impregnating the monolith with a hot solution of agarose, followed by removal of excess hot agarose solution from the cells within the monolith using compressed air and subsequently cooling the monolith to gel the agarose coating. One of the major problems with this coating process is that the coatings are difficult to effect on porous materials. In the article mentioned above, the agarose had to be applied in a heated state (thus requiring a substrate that is heat stable) making its application difficult to control as gelling occurred as the temperature dropped. A further problem is that only very thin coatings that have only surface activity can be created as occurs in membrane adsorbers. In part, this may be due to the method used for removing excess agarose. It may also be a function of the agarose gel point and the higher viscosity that occurs as the temperature of the agarose approaches the gel point. Moreover, the process would be very difficult if not impossible with substrates having pores that are relatively small in comparison to the cell size of the monoliths. The reason for these difficulties is that in some cases, air cannot be readily forced through certain porous materials without disrupting or otherwise damaging the porous structure as is the case with certain fabrics or porous structures.

U.S. Pat. No. 6,562,573 describes an approach for making an agarose coated substrate by methods that rely on forming a room temperature stable agarose solution through the use of high levels of chaotropic agents such as urea. These chaotropic agents create a modified, denatured form of agarose by interfering with stabilizing intra-molecular interactions mediated by non-covalent forces such as hydrogen bonds, van der Waals forces, and hydrophobic effects. A major problem with the method of U.S. Pat. No. 6,562,573 is that the process causes the pores of the substrate to be substantially blocked, severely limiting convective flow through the porous support. Additionally, the diffusional resistance is high, limiting the ability of the media to work rapidly.

U.S. Pat. No. 7,479,223 describes a porous adsorptive or chromatographic media comprised of a porous non-woven fabric with a coating of agarose that is about 1 micrometer to 40 micrometers thick. This method is similar to U.S. Pat. No. 6,562,573 in that it describes an approach for making an agarose coated substrate, by methods that rely on forming a room temperature stable agarose solution through the use of high levels of chaotropic agents such as urea. Water or ethanol or other reagents are carefully added to extract the chaotopic agent such that a gel-like precipitate forms at the interface between the agarose solution and the added reagent. This gel layer prevents migration of the agarose in the chaotropic mixture but allows further migration of the water, urea, or other chaotropic molecules out of the agarose solution and into the surrounding environment. Thus, the modified agarose solutions of U.S. Pat. No. 7,479,223 result in an agarose gel-like deposit that is in a chemically and physically altered state compared to native agarose gels prepared without additives. Again, as in U.S. Pat. No. 6,562,573, the process continues until the agarose solution turns into a "gel" within the interstices of the pores of a porous substrate or as a thin coating on the surface of the fibers of the substrate. Thus, a problem with this method is that only thin coatings that have only surface activity are created. In part, this may be due to the blotting or squeegee method used for removing excess agarose. Moreover, the blotting/squeegee process of this patent would be very difficult if not impossible with substrates having a pore structure that is relatively small. The reason for these difficulties is that in some cases, the squeegee process used in this method cannot readily force the coating solution through certain porous materials without disrupting or otherwise damaging the porous structure as is the case with certain fabrics or porous materials.

A schematic diagram of a conventional composite material 10 is shown in FIG. 1, according to U.S. Pat. No. 7,316,919 which describes a support member 12 comprising a plurality of (large) pores 16 and with a non self-supporting porous gel or polymer 14 being located in the spaces between the fibers of the support member. The porous pore structure of the composite material described in U.S. Pat. No. 7,316,919 is a random discontinuous pore structure due to modifications to the functional polymer by the use of porogens to form a heterogeneous polymer matrix with many holes or pores 16 in it. Thus, preparation of this composite material is a one step process using porogens to create significant chemical and physical modifications of the functional polymer leading to the final product.

SUMMARY

Aspects of the present invention relate to porous materials comprising an interpenetrating polymer network (IPN) with engineered porosity and mechanical strength and to the process for preparation and uses thereof. The IPN includes a first polymer network in the form of a porogenic support fabric (PSF) composed of polymers in the form of a pre-formed network composed of a fibrous composite and a second polymer network having an average pore size of from about 0.1 nanometers to about 200 nanometers synthesized, gelated, and/or cross-linked in the presence of the first polymer network to form a system of polymers which have their respective chains held in place by means of permanent physical entanglements produced by the interweaving of the component polymer networks. The second polymer network may be comprised of polymerized monomer units or gelatable polymers. Aspects of the present invention also encompass the use of such a composite material in chromatography for the separation and purification of target molecules such as biomolecules, proteins, and nucleic acids, for use as a support in chemical synthesis, or for use as a support for cell growth.

Accordingly, in one embodiment, an interpenetrating polymer network (IPN), includes a first polymer network comprising a partially dissolved fibrous composite, a second polymer network interwoven with the partially dissolved fibrous composite and a mechanically engineered interstitial pore structure, the pores substantially cylindrical in shape and interconnected at fiber crossover points throughout the IPN to facilitate uniform permeation of fluids throughout the IPN.

These materials can also be utilized as components of devices for medical diagnostics and for medical therapeutics in applications, including but not limited to, wound dressings, infection control, drug delivery, cell therapy, and in industrial applications including food and beverage processing. Furthermore, there are applications as laboratory scale research products involved in the processing of samples for the purposes of drug discovery and related laboratory operations for the purpose of generating information.

Embodiments of the invention include partially degradable fibrous materials in novel compositions that can be impregnated with a polymer or gel forming solution and further processed to create a permeable thin sheet material. In particular, polysaccharides such as agarose and other hydrogels such as polyacrylamides are impregnated into so-called porogenic support fabrics to create an interpenetrating polymer network (IPN) with one polymer network being a fibrous composite which can be further processed or selectively degraded to create porous, supported sheet materials suitable for chromatography and other applications. The modified agarose solutions including, for example, additives for the purpose of causing phenomena such as phase separation and the like of conventional attempts to produce chromatographic media result in an agarose gel in a chemically and physically altered state. In comparison, resultant agarose embodiments of the present invention are created wherein an agarose solution at elevated temperature is allowed to gel by slowly cooling the homogeneous solution under conditions where the agarose monomers are allowed to self associate to form a stable hydrogel of uniform concentration and with a uniform ultrastructure thus preserving the intrinsic properties of the desired native or naturally occurring agarose gel.

The present invention relates to a process for producing porous, supported polymeric materials, in particular the present invention is related to a process for forming porous, supported hydrogels combined with nonwoven fabrics. For many applications, it is advantageous for materials to be porous and the degree of porosity depends on the application. For example, membrane filtration depends on the use of porous polymers to effect the separation of various materials and there are a number of medical applications for drug delivery and tissue engineering that rely on porous polymeric materials.

Thus, it is desirable to have alternative porogenic technology which can be engineered to desired levels of porosity, without the use of flammable and toxic reagents, and without changes to the intrinsic properties and pore structure of the functional polymer.

Embodiments of the present invention have an advantage over conventional chromatographic materials in that the intrinsic structure and polymer properties of both the first and second polymers are not altered in the process of making a substrate with engineered porosity and improved mechanical strength. Aspects of the present invention allow for the preparation of new substrates using properties and formulations of known and existing fibrous composites as the first polymer of the IPN and of known polymer forming solutions for the second polymer of the IPN which can easily be transferred to a casting process thereby maintaining the intrinsic properties of the second polymer and with the desired engineered porosity and mechanical strength in the final interpenetrating polymer network. Aspects of the present invention provide the capability to use well characterized properties to prepare new materials with designed and expected properties of porosity, flux, and compressive and tensile strength but without the need for extensive trial and error experimentation resulting from the alteration of the first and second polymers.

There is a need for the simple and cost effective preparation of a porous adsorptive or chromatographic media having good convective and diffusional flow over only short distances. More particularly, what is needed is a porous adsorptive or chromatographic media formed of a porous substrate having a porous, functional polymer which allows good convective flow through the porous substrate with diffusive flow over short distances within the polymer itself and such that it provides for good dynamic adsorptive capacity for capture and release chromatography applications.

The invention relates to a functional, porous, interpenetrating polymer network (IPN) composed of at least two polymers with at least one polymer having been synthesized, gelated, and/or cross-linked in the immediate presence of the other and with engineered porosity, mechanical strength, diffusional characteristics, and to the process for preparation and uses thereof. In addition, the present invention relates to porogenic support fabric (PSF) substrates composed of polymers in the form of a pre-formed network composed of a fibrous composite and to the process for preparation and uses thereof. The IPN includes a first polymer network in the form of the PSF composed of polymers in the form of a pre-formed network composed of a fibrous composite and a second polymer network having an average pore size of from about 0.1 nanometers to about 200 nanometers synthesized, gelated, and/or cross-linked in the presence of the first polymer network to form a system of polymers which have the respective chains held in place by means of permanent physical entanglements produced by the interweaving of the component polymer networks. Embodiments of this invention also provide a composite material for use in chromatography for the separation and purification of target molecules such as biomolecules, proteins, and nucleic acids, for use as a support in chemical synthesis, or for use as a support for cell growth.

The present invention also relates to porous adsorptive and/or chromatographic materials and methods of making them. More particularly, it relates to porous adsorptive and/or chromatographic materials having one or more hydrogels and which have good convective flow and good diffusional flow characteristics, high adsorptive capacity and mechanical strength.

Existing processes for preparing related types of materials are single step physicochemical processes where a pore structure is created during the polymerization/gelation process. In aspects of this invention, the pore forming physicochemical process is not part of a polymerization/gelation process. Rather, the pore forming process is decoupled from polymerization/gelation and the pore forming is done separately and with the advantage of (1) no interfering or influencing the polymerization/gelation process and (2) enablement of precise engineering of the pore structure by selection of fiber properties and PSF characteristics described herein.

The macroporous IPN advantageously circumvents a problem associated with porous adsorptive or chromatographic materials in the form of small particles or beads. Typically, a bead's mechanical strength is coupled to the chemical and physical properties of the adsorbing material being used. For example, agarose beads are common adsorbents in chromatographic applications. Agarose beads must be modified, such as by chemical cross-linking, to increase their mechanical strength in order to operate at reasonable pressures and flow rates without deforming and collapsing when packed into a column. This modification can change the chromatography performance characteristics of the resulting material. Having the mechanical and chemical properties of the bead structure coupled as a single physicochemical event is a limitation associated with most beaded media. Aspects of the present invention rely upon a unique set of characteristics of the first polymer for its strength, a unique secondary set of characteristics of the first polymer for its macroporous structure, and on a unique and independent set of characteristics of the second polymer for the intrinsic adsorptive properties of the final chromatographic substrate.

Another advantage of the macroporous IPN substrate is the ease of handling. In general, beads must be packed into a column. The quality of this packing determines the performance of the adsorbing bed. This adds another source of variability to the chromatographic process and must be validated before use. The macroporous IPN substrate can operate in several device formats, which can be manufactured and validated prior to use, eliminating a source of variability during the chromatographic process.

Embodiments of the present invention provide a porous composite material comprising an interpenetrating polymer network (IPN) with engineered porosity and mechanical strength for chromatographic or adsorptive separations. The IPN comprises (a) a first polymer network in the form of the porogenic support fabric (PSF) substrate composed of polymers in the form of a pre-formed network composed of a fibrous composite first polymer self-supporting structure and (b) one or more second polymer networks impregnated onto and throughout substantially all surfaces of the substrate, the substrate being selected from the group including woven fabrics, non-woven fabrics, felts, mats and porous membranes, and (c) the second polymer network synthesized, gelated, and/or cross-linked in the presence of the first polymer network to form a system of polymers which have the respective chains held in place by means of permanent physical entanglements produced by the interweaving of the component polymer networks and (d) the second polymer network occupying from about 10 to about 90% of the volume of the final IPN media after dispersal and removal of a portion of the PSF and (e) the IPN media having good convective flow and diffusional flow.

Other embodiments provide a porous composite material comprising an interpenetrating polymer network (IPN) with engineered porosity and mechanical strength for chromatographic or adsorptive separations. The IPN comprises (a) a first polymer network in the form of the porogenic support fabric (PSF) substrate composed of linear polymers in the form of a pre-formed network composed of a fibrous composite first polymer self-supporting structure and (b) one or more second polymer networks impregnated into and throughout substantially all surfaces of the substrate, the substrate being selected from the group including woven fabrics, non-woven fabrics, felts, mats and porous membranes, and (c) the second polymer network having an average pore size of from about 0.1 nanometers to about 200 nanometers synthesized, gelated, and/or cross-linked in the presence of the first polymer network to form a system of polymers which have the respective chains held in place by means of permanent physical entanglements produced by the interweaving of the component polymer networks and (d) the second polymer network occupying from about 10 to about 90% of the volume of the final IPN substrate after dispersal and removal of a portion of the PSF and (e) the one or more second polymer networks being formed of one or more polysaccharides and the IPN media having good convective flow, diffusional characteristics, mechanical, strength and adsorptive capacity.

Still other embodiments of the present invention provide a porous composite material comprising an interpenetrating polymer network (IPN) with engineered porosity and mechanical strength for chromatographic or adsorptive separations. The IPN comprises (a) a first polymer network in the form of the porogenic support fabric (PSF) substrate composed of linear polymers in the form of a pre-formed network composed of a fibrous composite first polymer self-supporting structure and (b) one or more second polymer networks cast onto or impregnated into and throughout substantially all surfaces of the substrate, the substrate being selected from the group including woven fabrics, non-woven fabrics, felts, mats and porous membranes, and (c) the second polymer network synthesized, gelated, and/or cross-linked in the presence of the first polymer network to form a system of polymers which have the respective chains held in place by means of permanent physical entanglements produced by the interweaving of the component polymer networks and (d) the second polymer network occupying from about 10 to about 90% of the volume of the final IPN media after dispersal and removal of a portion of the PSF and (e), the one or more second polymer networks being formed of one or more polysaccharides and the substrate having good convective flow and diffusional characteristics. One type of polysaccharides that relates to aspects of this invention can be any polysaccharide capable of forming a gel, preferably by a change of temperature, and may be selected from the group including agarose, agar, cellulose, dextran, starch, chitosan, konjac, curdlan, carrageenan, pectin, gellan, and alginate. As the skilled person will understand, such gelled polysaccharides are advantageously comprised of one polysaccharide, but aspects of the present invention use a mixture of two or more polysaccharides. In embodiments of the present method, the porogenic support fabric is impregnated with a polysaccharide, and in a specific embodiment, the polysaccharide is agarose.

BRIEF DESCRIPTION OF DRAWINGS

The foregoing and other aspects, embodiments, objects, features and advantages of the present teachings can be more fully understood from the following description in conjunction with the accompanying drawings. In the drawings, like reference characters generally refer to like features and structural elements throughout the various figures. The drawings are not necessarily to scale, emphasis instead being placed upon illustrating the principles of the present teachings. The following drawings are illustrative of embodiments of the invention and are not meant to limit the scope of the invention as encompassed by the claims.

DETAILED DESCRIPTION OF THE INVENTION

Figure 1:
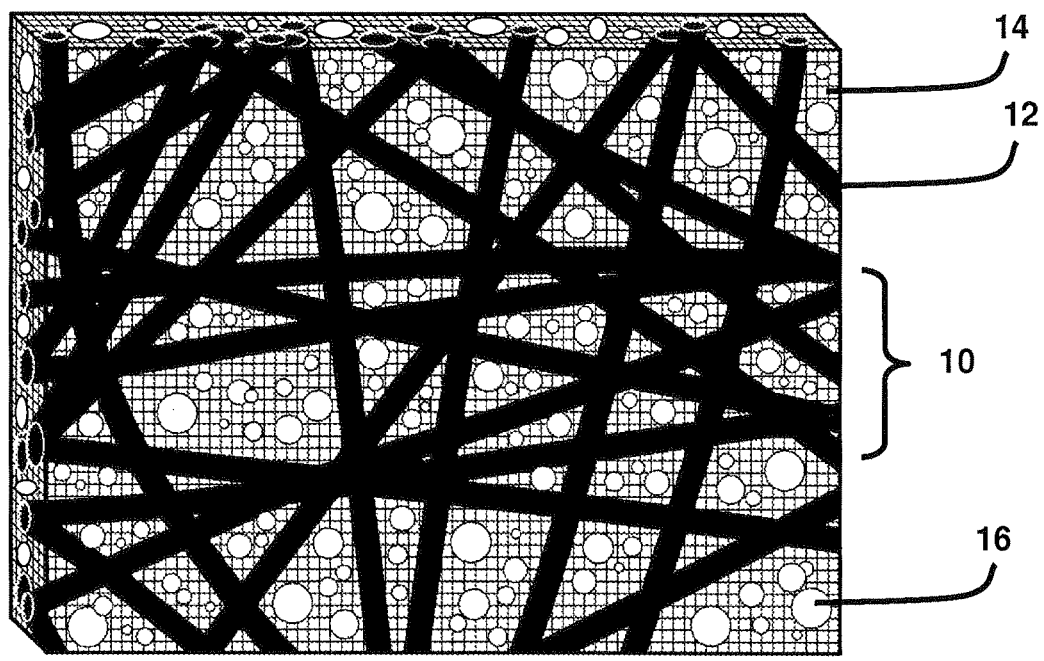
FIG. 1 is a schematic diagram of a lateral section, close-up view of a conventional porous composite.

The present invention relates to the composition and process for making an interpenetrating polymer network (IPN) with engineered porosity and mechanical strength. Also, the present invention relates to the composition and process to make a porogenic support fabric (PSF) including a dispersible fiber network (DFN) and an inert fiber network (IFN).

The present invention depends, in part, upon the surprising discovery that contrary to conventional thinking, a short cut polylactic acid (PLA) fiber typically only suitable for making fabrics out of dry processes including air-laid and bonded carded web processes due to its hydrolytic nature, was used successfully in a wet-laid process to prepare the porogenic support fabric (PSF).

In particular, the present invention relates to an IPN including a first polymer network in the form of a porogenic support fabric (PSF) composed of polymers in the form of a fibrous composite which can be partially dissolved and a second polymer network synthesized, gelated, and/or cross-linked in the presence of the first polymer network. In this manner, an IPN is formed which has the respective networks held in place by means of permanent physical entanglements produced by the interweaving of the component polymer networks. Subsequently, the IPN can be treated to (a) partially dissolve and disperse a defined portion of the PSF fibers, the dispersible fiber network (DFN), to create a pre-designed, interconnected, macroporous structure; (b) leave a second portion of the PSF fabric, the inert fiber network (IFN) as an integral support matrix; and (c) chemically modify and functionalize sites on the second polymer; thus, creating a final IPN substrate with functional groups, engineered porosity and mechanical strength.

In one embodiment, the final IPN substrate can be useful as an adsorptive chromatographic media (ACM) with one or more functional second polymer networks comprising about 10-90% of the volume of the IPN substrate. In another embodiment, the functional second polymer network comprises 30-90% of the volume of the IPN substrate. In another embodiment, the functional second polymer network preferably comprises 50-90% of the volume of the IPN substrate. The final IPN substrate having a supported, second polymer network which may be cross-linked, have one or more functional capture chemistries attached to it, and can be useful as an ACM for chromatography and filtration of various compounds including biomolecules such as proteins, DNA and other molecules. The final IPN substrate has (a) good convective flow around the surfaces of the second polymer network due to the interconnected macroporous structure resultant from the removal of the DFN, (b) good diffusional characteristics throughout the porous structure of the second polymer network and (c) high adsorptive capacity for various compounds such as biomolecules. In one embodiment, the final IPN substrate has engineered porosity of 5-50% and mechanical strength of 1-10 pounds/inch. In a preferred embodiment, the final IPN substrate has engineered porosity of 10-30% and mechanical strength of 2-8 pounds/inch.

The term "interpenetrating polymer network" (IPN) as used herein describes a material comprising two or more different polymer networks which are at least partially interlaced on a molecular scale of size and dimensions but may not be covalently bonded to each other.

In some embodiments the IPN comprises a first polymer network which is present as an interconnected fibrous composite and having physical dimensions from about 0.1 to 50 micrometers in diameter and a second polymer network which is interlaced with the first polymer network on a molecular scale of size and dimensions.

The term "fibrous composite" as used herein describes a material that is comprised of a mixture of fibers typically but not exclusively in the form of a woven or nonwoven fabric. The mixture of fibers result in a fibrous composite having a pore size of from about 0.1 to about 200 microns and the fibrous composite further comprises thermoplastic fibers having melt temperatures from about 50 degrees Centigrade to about 250 degrees Centigrade.

The term "polymer" as used herein refers to a large molecule (macromolecule) composed of repeating structural units, monomers or monomeric units, connected by covalent chemical bonds.

The term "polyester" as used herein is intended to embrace polymers wherein at least 85% of the recurring units are condensation products of dicarboxylic acids and diols with linkages created by formation of ester units. Examples of polyesters include poly (ethylene terephthalate) (PET), which is a condensation product of ethylene glycol and terephthalic acid, and poly(1,3-propylene terephthalate), which is a condensation product of 1,3-propanediol and terephthalic acid.

The term "polylactic acid" or "polylactide" or PLA as used herein is intended to encompass not only the homopolymers of lactic acid or lactide including mixture of optical isomers of levorotary (L) enantiomer and dextrorotary (D) enantiomer, but also copolymers and derivates of at least 70% of the recurring units are lactic acid or lactide units.

The term "polyethylene" or PE as used herein is intended to encompass not only homopolymers of ethylene, but also copolymers wherein at least 85% of the recurring units are ethylene units, and includes "linear low density polyethylenes" (LLDPE) which are linear ethylene/olefin copolymers having a density of less than about 0.955 g/cm$^3$, and "high density polyethylenes" (HDPE), which are polyethylene homopolymers having a density of at least about 0.94 g/cm$^3$.

The term "polypropylene" or PP as used herein is intended to encompass not only homopolymers of propylene, but also copolymers wherein at least 85% of the recurring units are propylene units. The polypropylene may be generally linear or branched polymers.

The term "copolyester" as used herein is intended to embrace block, graft, random and alternating polyester copolymers.

The terms "nonwoven fabric", "nonwoven sheet", "nonwoven layer", and "nonwoven web" as used herein refer to a structure of individual fibers, filaments, or threads that are positioned in a random manner to form a planar material without an identifiable pattern, as opposed to a knitted or woven fabric. Examples of nonwoven fabrics include wetlaid webs, airlaid webs, meltblown webs, spunbond webs, and composite sheets comprising more than one nonwoven web.

The term "machine direction" (MD) is used herein to refer to the direction in which a nonwoven web is produced (e.g. the direction of travel of the supporting surface upon which the fibers are laid down during formation of the nonwoven web). The term "cross direction" (XD) refers to the direction generally perpendicular to the machine direction in the plane of the web.

The term "spunbond fibers" as used herein means fibers that are melt-spun by extruding substantially continuous molten thermoplastic polymer material as fibers from a plurality of fine, usually circular, capillaries of a spinneret with the diameter of the extruded fibers then being rapidly reduced by drawing and then quenching the fibers.

The term "meltblown fibers" as used herein, means fibers that are melt-spun by meltblowing, which comprises extruding a melt-processable polymer through a plurality of capillaries as molten streams into a high velocity gas (e.g. air) stream.

The term "multiple component fiber" as used herein refers to a fiber that is composed of at least two distinct polymeric components that have been spun together to form a single fiber. The at least two polymeric components are arranged in distinct, substantially contiguous zones across the cross-section of the multiple component fibers, the zones extending substantially continuously along the length of the fibers.

The term "bicomponent fiber" is used herein to refer to a multiple component fiber that is made from two distinct polymer components, such as sheath-core fibers that comprise a first polymeric component forming the sheath, and a second polymeric component forming the core; and side-by-side fibers, in which the first polymeric component forms at least one segment that is adjacent at least one segment formed of the second polymeric component, each segment being substantially continuous along the length of the fiber with both polymeric components being exposed on the fiber surface. Multiple component fibers are distinguished from fibers that are extruded from a single homogeneous or heterogeneous blend of polymeric materials.

The term "multiple component nonwoven web" as used herein refers to a nonwoven web comprising multiple component fibers. A multiple component web can comprise single component and/or polymer blend fibers, in addition to multiple component fibers.

The term "particulate" means herein a separation matrix comprised of particles or beads, such as essentially spherical particles or less regularly shaped particles.

The "gelling point" sometimes herein denoted the "gelling temperature" means the temperature at which the polymers of a solution interacts physically to form a solid gel. The term "gelatable" means herein capable of forming a physical gel.

The term "native" polysaccharide or polymer refers to a polysaccharide or polymer in a non-modified state, i.e. a polysaccharide or polymer which has not been substituted or derivatized.

The term "native" agarose refers to agarose gel in a non-modified state, i.e. agarose gel formed from an agarose powder which has been dissolved in hot aqueous or buffered aqueous solution and allowed to form a gel after cooling the agarose solution to a temperature below its natural or native gel forming temperature.

The term separation "matrix" means herein a material comprised of a porous or nonporous solid support, to which ligands have been attached. In the field of chromatography, the separation matrix is sometimes denoted resin or media.

The term "ligands" is used herein in its conventional meaning, i.e. for chemical entities which are capable of interacting with a target molecule, such as charged groups capable of interacting with an oppositely charged target molecule in an ion-exchange process.

The term "agarose" as used herein refers to a polysaccharide commonly but not exclusively obtained from red algae of the Rhodophyceae class which can be considered as an alternating copolymer of β-D-galactopyranosyl and 3,6-anhydro-α-L-galactopyranosyl units, linked in the backbone by 1→3 and 1→4 glycosidic bonds, respectively. The basic agarobiose repeat unit forms long chains with an average molecular mass of ~120,000 Daltons or about 400 agarobiose units. Agarose forms thermoreversible "agarose gels" in water at a concentration as low as 0.1% and at temperatures considerably below the temperature of gel melting (Tgelation ~40° C. and Tmelting ~90° C.) and depending on the presence of other substituents.

The term "staple fiber" as used herein refers to natural or man-made short lengths of fiber which have been chopped from continuous filaments and are typically cut to lengths ranging from 0.1 to 2.0 inches and deniers from about 1 to 25 dpf and which are commonly used in air-laid and wet-laid processes for making nonwoven fabrics.

The term "denier" or "dpf" as used herein refers to a measure of linear density; the weight in grams of 9,000 metres of yarn.

The term "melting temperature" (also referred to as the melting point) as used herein refers to the temperature in degrees Centigrade at which the polymeric fiber softens and allows the polymer to flow in order to create bond points between other fibers especially during thermobonding and calendering operations.

The term "inert" as used herein refers to a composition or portion of a composition which is stable and unaffected under reaction conditions of chemistry designed to affect other components of a reaction mixture.

The term "dispersible" as used herein refers the fibers in a fibrous composite which can be removed under reaction conditions of chemistry where an inert composition is stable and unaffected to result in a partially dissolved fibrous composite.

Figure 2:
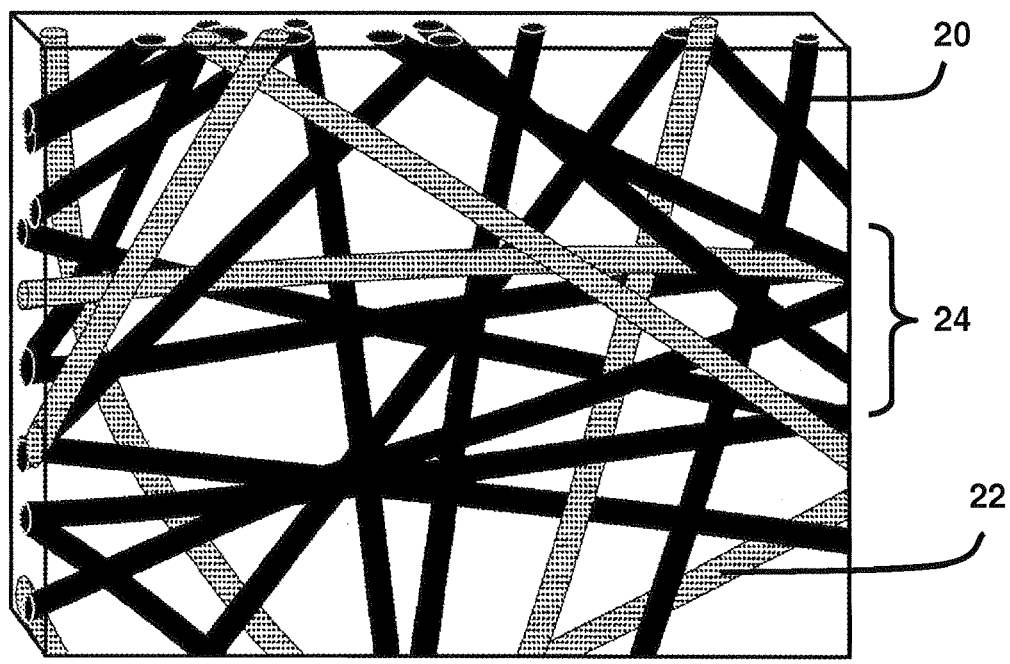
FIG. 2 is a schematic diagram of a lateral section, close-up view of a Porogenic Support Fabric (PSF) showing approx. 25% dispersible fiber network (DFN) and approx. 75% Inert Fiber Network (IFN) according to an aspect of the invention.
Figure 3:
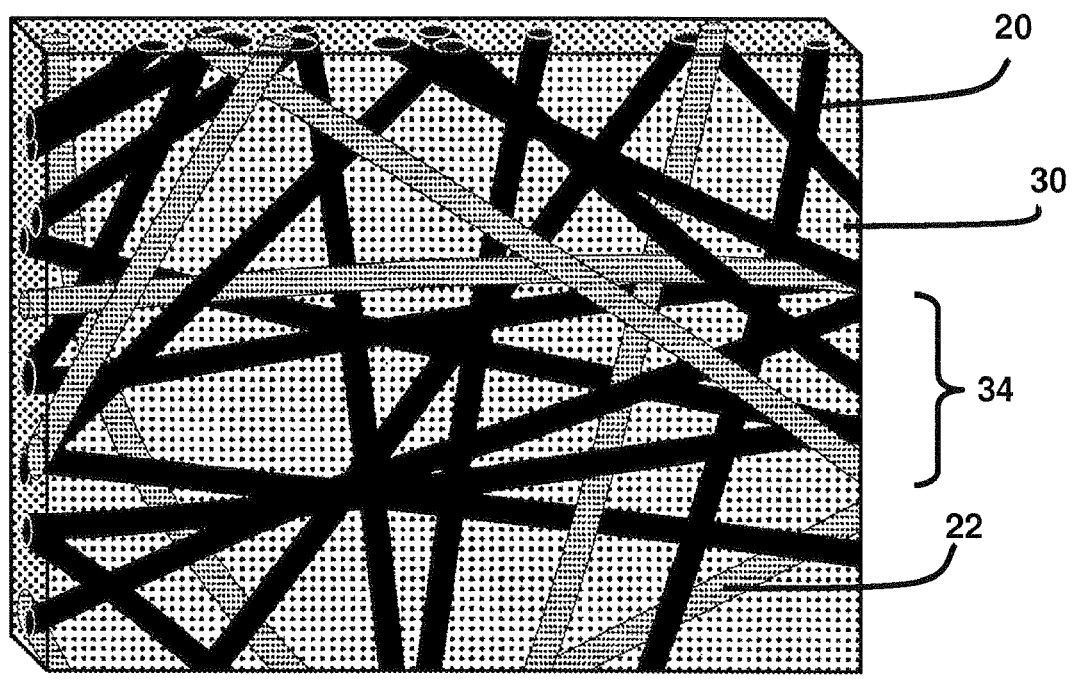
FIG. 3 is a schematic diagram of a lateral section, close-up view of an interpenetrating polymer network (IPN) composed of Porogenic Support Fabric (PSF) as a first polymer network impregnated with a second polymer network according to an aspect of the invention.
Figure 4:
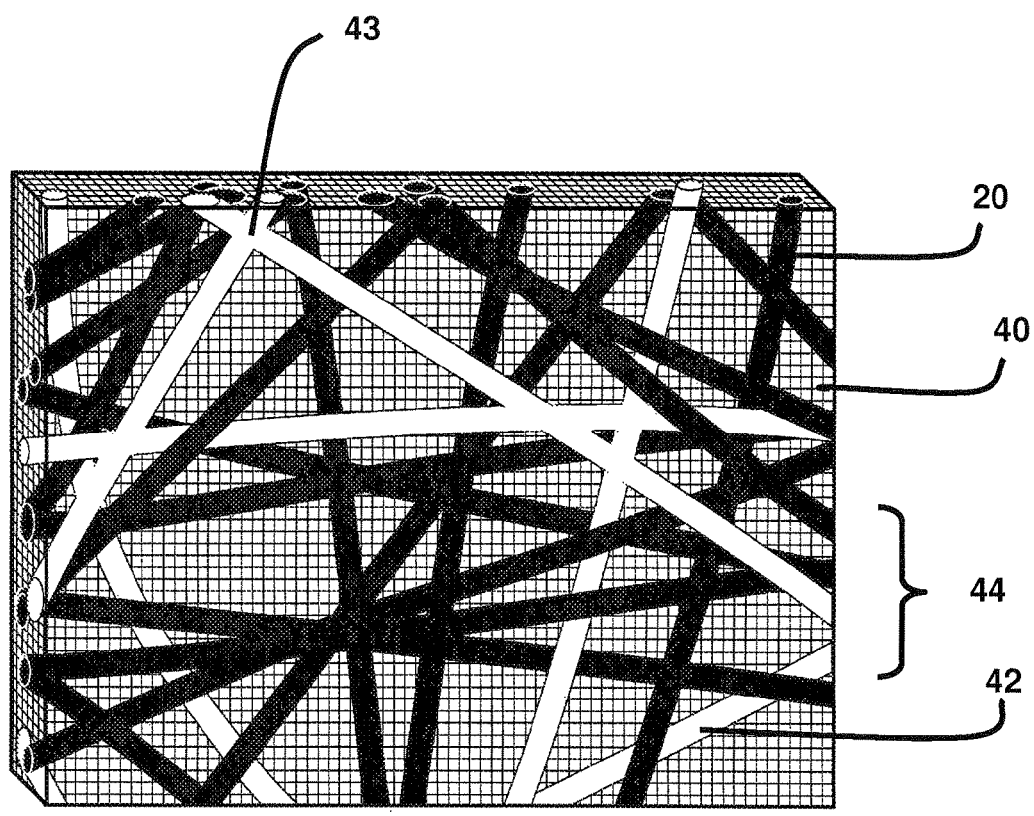
FIG. 4 is a schematic diagram of a lateral section, close-up view of a macroporous interpenetrating polymer network (IPN) composed of a structurally supportive Inert Fiber Network (INF) with an impregnated, cross-linked second polymer network and an engineered pore structure resultant from the dissolution and removal of the Dispersible Fiber Network (DFN) according to an aspect of the invention.
Figure 5:
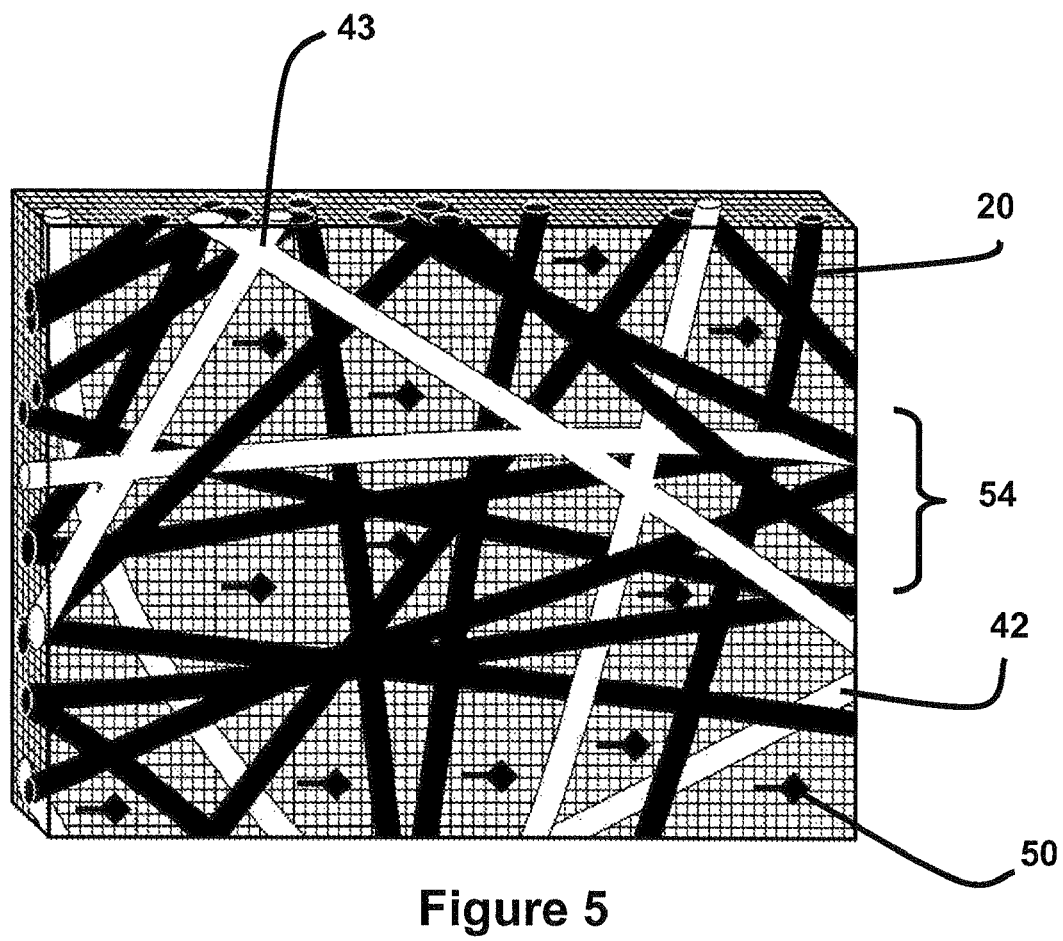
FIG. 5 is a schematic diagram of a lateral section, close-up view of a macroporous interpenetrating polymer network (IPN) composed of a structurally supportive Inert Fiber Network (INF) with an impregnated, cross-linked second polymer network and with functional capture chemistries, engineered porosity, and mechanical strength according to an aspect of the invention.

FIGS. 2, 3, and 4 show the various intermediary structures used in the preparation of the final IPN substrate 54 with engineered porosity, and mechanical strength shown in FIG. 5.

Now referring to FIG. 2, a Porogenic Support Fabric (PSF) substrate 24 is formed from a predetermined mixture of inert fibers 20 and dispersible fibers 22 which are, for example, typically about 0.1 micrometer to about 50 micrometers in diameter.

As described below in the case studies of Example 1, the desired properties of a macroporous interpenetrating polymer network (IPN) final product were used to engineer the Porogenic Support Fabric (PSF) substrate. Fiber length, fiber diameter, fiber melt characteristics, desired PSF material basis weight, fiber blend weight ratios, and final calendered material thickness for preparing a suitable PSF substrate were derived based on the desired properties of the final IPN product such as (a) void volume or porosity, (b) volume fraction of inert fiber, and (c) volume fraction of the functional polymer.

Now referring to FIG. 3 the PSF substrate 24 of FIG. 2 can be impregnated with a polymer 30 thereby forming an interpenetrating polymer network 34. The interpenetrating polymer network including a first polymer network in the form of a porogenic support fabric (PSF) composed of linear polymers in the form of a fibrous composite and a second polymer network 30 having been synthesized or gelated in the presence of the first polymer network.

Now referring to FIG. 4, a macroporous IPN 44 with engineered porosity of 5-50% and mechanical strength of 1-10 pounds/inch comprises a first polymer network and the second, cast polymer including cross-links 40 thereby forming a support matrix of inert fiber 20 and also having macroporous channels 42 throughout the cast second polymer, creating a macroporous network comprising an interconnected macroporous network 43 of open channels created by the in-situ (or subsequent) dissolution and removal of the DFN during the chemical process to cause the cross-links.

Now referring to FIG. 5, a final IPN substrate 54 with engineered porosity, and mechanical strength comprising a first polymer network including the IFN and a second, cast polymer network containing cross-links and including functional groups 50 such as ion exchange groups or affinity ligands and having the support matrix of inert fiber 20 comprising the IFN and a macroporous network throughout the cross-linked cast polymer with functional groups and the macroporous network comprising an interconnected network of mostly tubular, open channels 42 and 43 for example created by the dissolution and removal of the DFN. The final macroporous IPN substrate, after the removal of the integral DFN, retention of the integral IFN, and including the functionalized polymer(s), has high permeability and mechanical strength with good flow and capacity characteristics necessary for applications in filtration, chromatography, and other applications.

Figure 6:
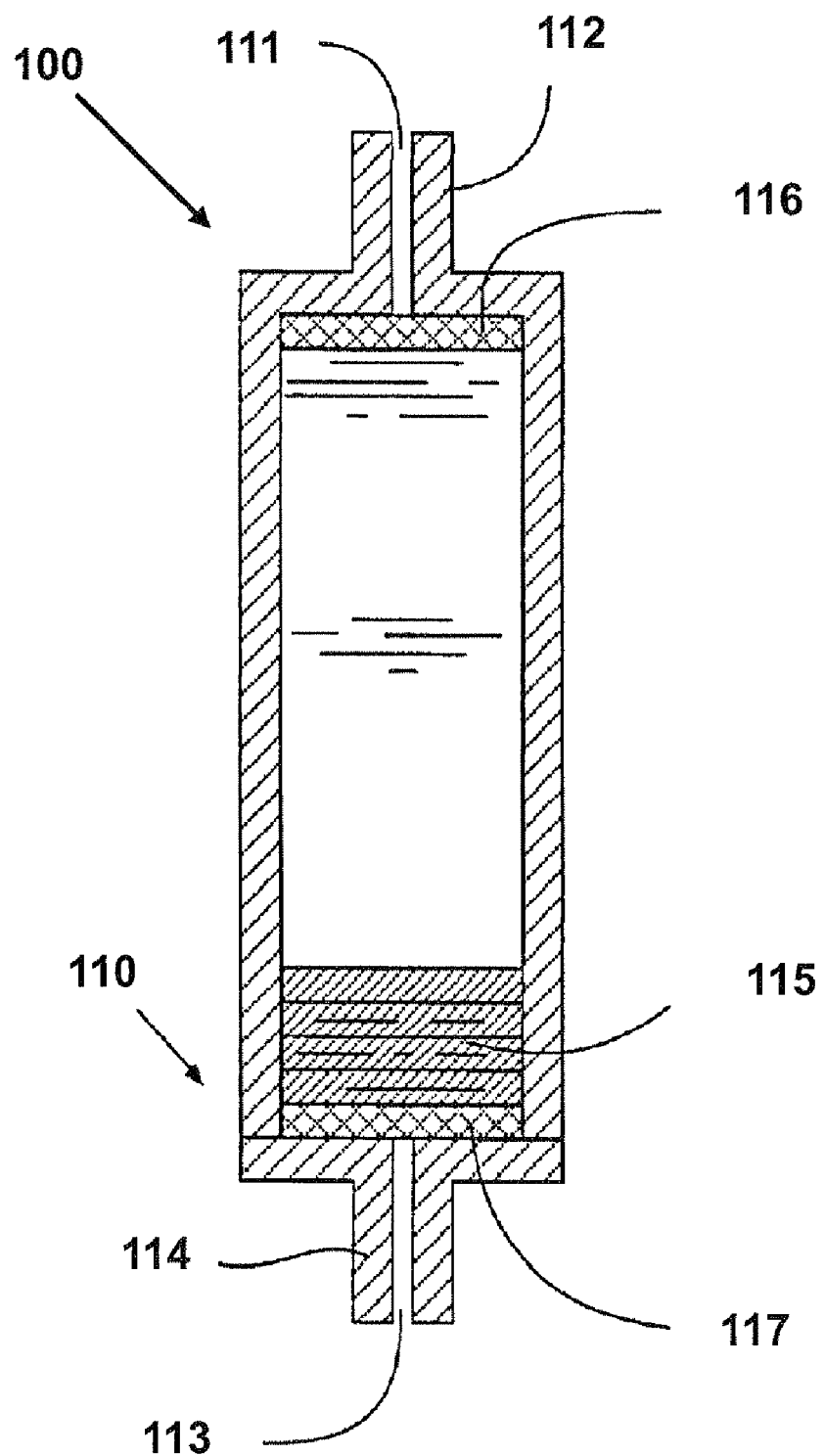
FIG. 6 is a schematic diagram of a filtration or chromatography device using the macroporous IPN substrates of FIG. 5.

Now referring to FIG. 6, a chromatography device 100, includes a holder 110 having an inlet 111 at a first end 112 and an outlet 113 at a second end 114 and a series of layers of the IPN material 115 in between. The chromatography device 100 further includes porous spacers, 116 and 117 disposed adjacent the inlet 111 and outlet 113 respectively and maintain the porous IPN substrates in place. The IPN is formed of a size such that the IPN substrate contacts the inner wall of the device so that substantially all flow must be through the body of the IPN substrate rather than by passing the flow along the inner wall or the like.

In operation, the holder can have a liquid stream (containing one or more desirable components for capture) run through the porous IPN substrate so that the desired components are adsorbed, captured, and thereby separated from the rest of the liquid. Typically, it is the desired components that are captured from the liquid and the rest of the liquid including impurities pass through. Alternatively, the desired components may pass through and impurities can be captured by the IPN substrate. The IPN holder is washed to remove any unbound materials and then the captured material is eluted using a change in ionic strength, pH or the like.

The IPN substrate can be used in lieu of conventional chromatography media to capture the selected molecule from a stream containing it along with other molecules and contaminants. It may be used in a primary clarification step in which relatively unfiltered cell broths, lysed cell broths and other crude process streams are initially treated to remove the larger contaminants. It may be used to treat blood or other bodily fluids to remove the selected molecule, be it a contaminant or undesired entity such as a pathogen or leukocyte or a desired molecule such as a growth hormone or the like. It may be used in classic chromatography application to purify proteins and other molecules. It may also be used to remove viruses, endotoxins and other impurities before a final release of the product. As can be appreciated the IPN substrates can be tailored to fit almost any particular application or use.

Figure 7:
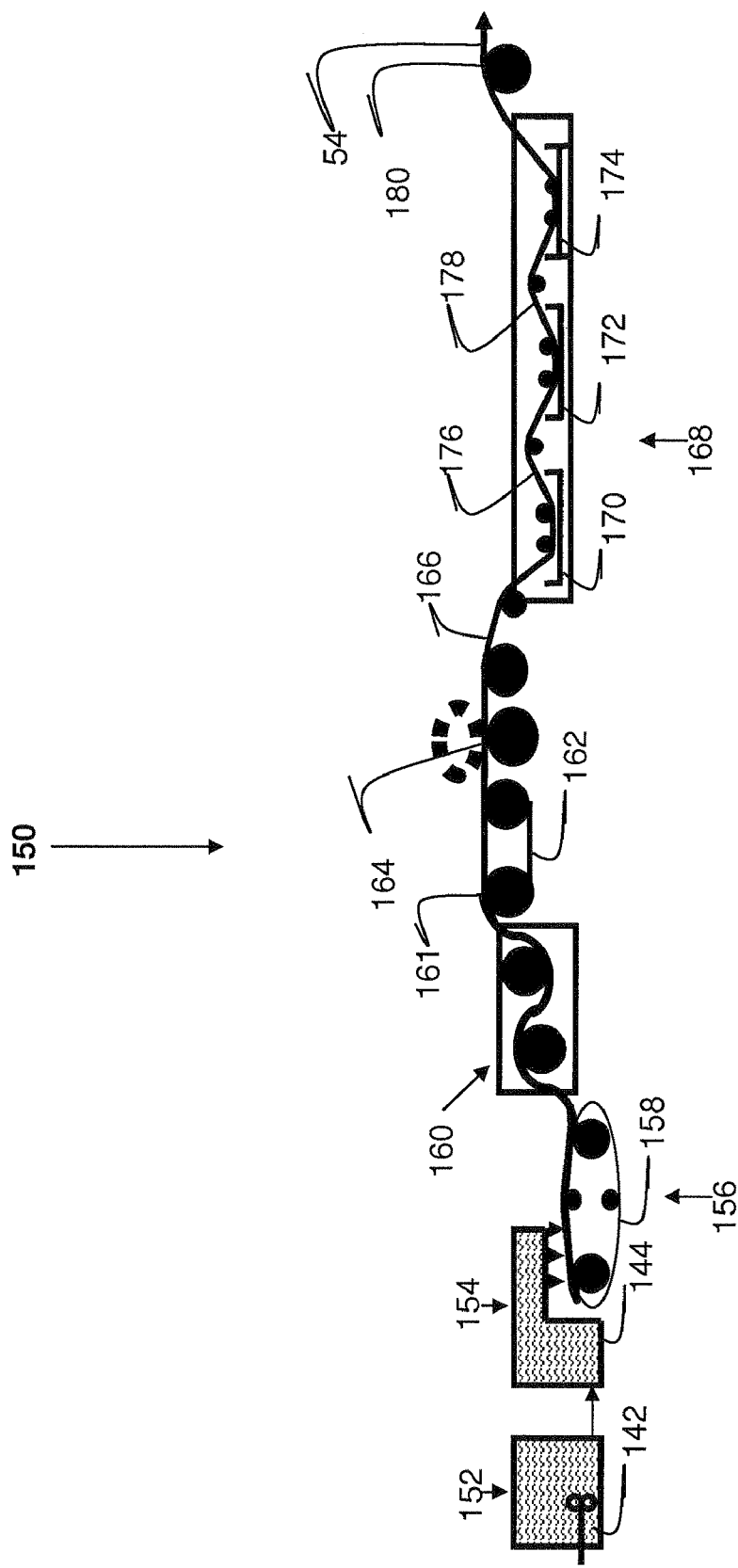
FIG. 7 is a schematic diagram of an in-line processing system for making an IPN substrate according to one aspect of the invention.

Now referring to FIG. 7, an exemplary in-line processing system 150 for making an IPN substrate includes a mixing chamber 152, and a head box 154. The head box 154 is disposed adjacent a moving collection belt 156, a drying oven with rollers 160, a web transfer belt 161, a calender nip 164 aligned serially to process material in a continuous web. Processing system 150 further includes baths including a casting bath 170, and final reaction baths 172 and 174, and a final roller 180.

In operation of the in-line processing system 150 provides a wetlaid process and calendering process to form the PSF substrate. The fibers 20 and 22 (FIG. 2) and/or blends of fibers such as those described in Example 2 are mixed with water to form an aqueous solution 142 in the mixing chamber 152 and head box 154 in which the fibers are suspended uniformly in water. The wet-laid fabric deposited on the moving collection belt 158 is first dried and lightly thermobonded by passing the fabric through a drying oven 160 and the fabric can be calendered by passing over a web transfer belt 161 and through a calender nip 164, such as a nip formed by pressing two rollers against each other in order to achieve an PSF substrate 24 (FIG. 2) surface with raised fibers. The casting bath 170 impregnates the PSF substrate with a polymer or gel forming solution, a reaction bath 172 is used for polymer cross-linking chemistry combined with dissolution and removal of dispersible fibers and an optional reaction bath 174 is used for chemical modification to add functional sites on the polymer and a wind up of the final IPN substrate 54 on the final roller 180.

In one embodiment, one of the rollers can be a heated metal roll having a non-stick, Tribicote™ finish (nickel/Teflon plating) with a fine ribbed or Shriner roller profile (preferably 260 fib lines at a depth of 0.001") and a second resilient (back-up) roll generally having a surface made of a softer material, such as nylon or compressed, heat resistant (HR) cotton. The second roll may be unheated and preferably has a Shore D hardness between about 70 and about 100. The hardness of the back-up roller combined with the calender nip pressure determines the size of the nip contact footprint, with softer rollers having the potential for significant deflection that will create a large contact footprint between the rollers. The larger the footprint, the more time the web can be subjected to the temperature and pressure in the nip and the larger the degree of thermal bonding of the web.

The PSF substrate 24 (FIG. 2) provides a number of advantages in use compared with incumbent membrane support fabrics. The PSF substrates have open porous fibrous surfaces which provide good interlocking with the second polymer network forming solution and therefore good adhesion to the cast polymer layer, and provide mechanical strength to the IPN substrates such that even soft polymers, hydrocolloids, hydrogels, and the like can be used for the polymer forming solution to form the IPN. The PSF substrates 24 have uniform thickness and basis weight, which in turn contribute to the thickness and uniformity of the IPN substrate. The mean pore size of the PSF substrates are controlled so that the polymer forming casting solution impregnated into the PSF substrate can be highly uniform, thereby improving the uniformity of the final IPN substrate 54 (FIG. 5).

In embodiments of the present invention in which the PSF substrate 24 (FIG. 2) can be formed from single component fibers, the combined calendering process conditions (roll temperature, nip pressure, and residence time or line speed) used to form the calendered sheets are selected to result in inter-fiber bonding at fiber cross-over points by melting and softening of the polymer without significant flowing caused by excessive melting of the polymer.

In the embodiments of the present invention in which the PSF substrate 24 (FIG. 2) can be formed from multiple component fibers (e.g., bicomponent fibers having a lower-melting polymeric component and a higher-melting polymeric component), the combined calendering process conditions used to form the calendered sheets are selected to cause the lower-melting polymeric component of the multiple component fibers in the web to flow into and fuse the contact points between the fibers while the higher-melting polymeric component of the multiple component fibers remain solid.

The calendered sheets of the PSF substrate 24 (FIG. 2) of the preferred embodiment are sheets that have been calendered under conditions that result primarily in inter-fiber bonding at fiber cross-over points by melting softening of the lower melting polymeric component without significant flowing of the lower-melting component. In order to achieve the desired degree of polymer flow during calendering, the heated roll temperatures are kept close to the melting point of the lower-melting polymeric component and the residence time in the nip can be adjusted by the line speed and nip pressure until the desired amount of polymer flow can be obtained. The difference between the temperature of the roller heating medium (e.g. oil, electric, etc.) and the surface temperature of the calender roll can be a function of the calendering equipment used and care is required to ensure that the rolls are not over- or under-heated.

The calendered sheets of the PSF substrate 24 (FIG. 2) can be bonded using a variety of calender roller configurations known in the art. In one embodiment of the invention, a nonwoven fabric can be passed through a first calender nip, formed by a ribbed heated metal roll and a resilient unheated back-up roll to smooth-calender one side of the fabric, and the fabric can be then immediately passed through another nip formed by a ribbed heated metal roll and an unheated back up roll to rough calender the opposite side of the fabric. Alternately, nonwoven fabric can be passed through a nip formed by a ribbed heated metal roll and a rough unheated back-up roll to calender one side of the fabric, in a single pass.

As shown in FIG. 7, the calendering process using the transfer belt 161 and the calender nip 164 can be performed in-line immediately after formation of the PSF substrate. Alternately, a pre-formed PSF substrate can be calendered in a separate process. The pre-formed PSF substrate can be pre-bonded, such as by through-air thermal bonding during the wet-laid or air-laid process, or thermal point bonding prior to being rolled up for calendering in a separate step. The calendered sheets preferably have a trap tear strength measured in both the machine direction and cross direction of between about 0.5 lb (2.2 N) and about 15 lb (67 N), and a Grab strength measured both the machine direction and cross direction of at least about 15 lb (67 N). The resulting calendered sheets of the PSF substrate 24 (FIG. 2) can be collected for later use or can be fed into the next processing step in a continuous manner.

As indicated in FIG. 7, the process of polymer casting, predefined pore formation, and functionalization are integral steps in the process for the preparation of a final macroporous IPN substrate. A polymer forming solution can be cast or impregnated by any known method onto and into the surface of the PSF substrate, thereby forming an IPN including a first polymer network comprised of the PSF substrate and a second polymer network which has been synthesized, gelated, and/or cross-linked in the presence of the first polymer network. The second polymer network can be a polymer with levels of porosity ranging from nanoporous polymers ($10^{-10}$ meters), microporous polymer ($10^{-7}$ meters) or a macroporous polymer ($10^{-4}$ meters). PSF substrates 24 formed from wet-laid, air-laid, spunbond, or meltblown fabrics are especially suitable for use as PSF substrates to prepare IPN substrates suitable for filtration or separation materials that separate matter from liquids or gases.

In the system 150 of FIG. 7, the polymer casting, predefined pore formation and functionalization can be completed in a single on-line process which can be immediately after the calendering process. The polymer forming solution can be applied onto the PSF substrate in a casting bath 170. The cast or second polymer of the resulting IPN 176 can be further treated with reagents and/or cross-linkers for the removal of the DFN and resulting predefined pore formation in a second bath 172. The resulting macroporous IPN substrate 178 with engineered porosity and mechanical strength can be functionalized with ion exchange ligands or affinity ligands or other capture chemistries in a third bath 174 resulting in the formation of a final, macroporous and functionalized IPN substrate 54. In another embodiment the cross-linking chemistry can be performed with in-situ, simultaneous dissolution and removal of the DFN in cases where suitable reactants are compatible and present so as to both dissolve the DFN and effect cross-linking of the polymer.

In another embodiment, a pre-formed PSF substrate 24 (FIG. 2) can be cast with the second polymer network forming solution in a separate process, the DFN can be removed in a separate process, the cross-linking can be performed in a separate process, and addition of functional capture chemistries can be performed in batch or in off-line processes. Known methods for casting a solution onto a substrate to form a composite solid matrix are described in Membrane Technology and Applications (2nd Edition) by Richard Baker, Wiley and Sons, 2004

In still another embodiment the PSF substrate can be made in the form of a monolith or solid matrix. In this case, the PSF substrate is not made as a continuous web, but instead is formed into a block, whose shape is determined by the shape of the mold used to form it. The engineered aspects of the PSF substrate, volume fraction of the porogenic fiber, volume fraction of the inert fiber, and void fraction can be engineered in the same manner for a PSF substrate in monolith form as a PSF substrate in web form.

Figure 8:
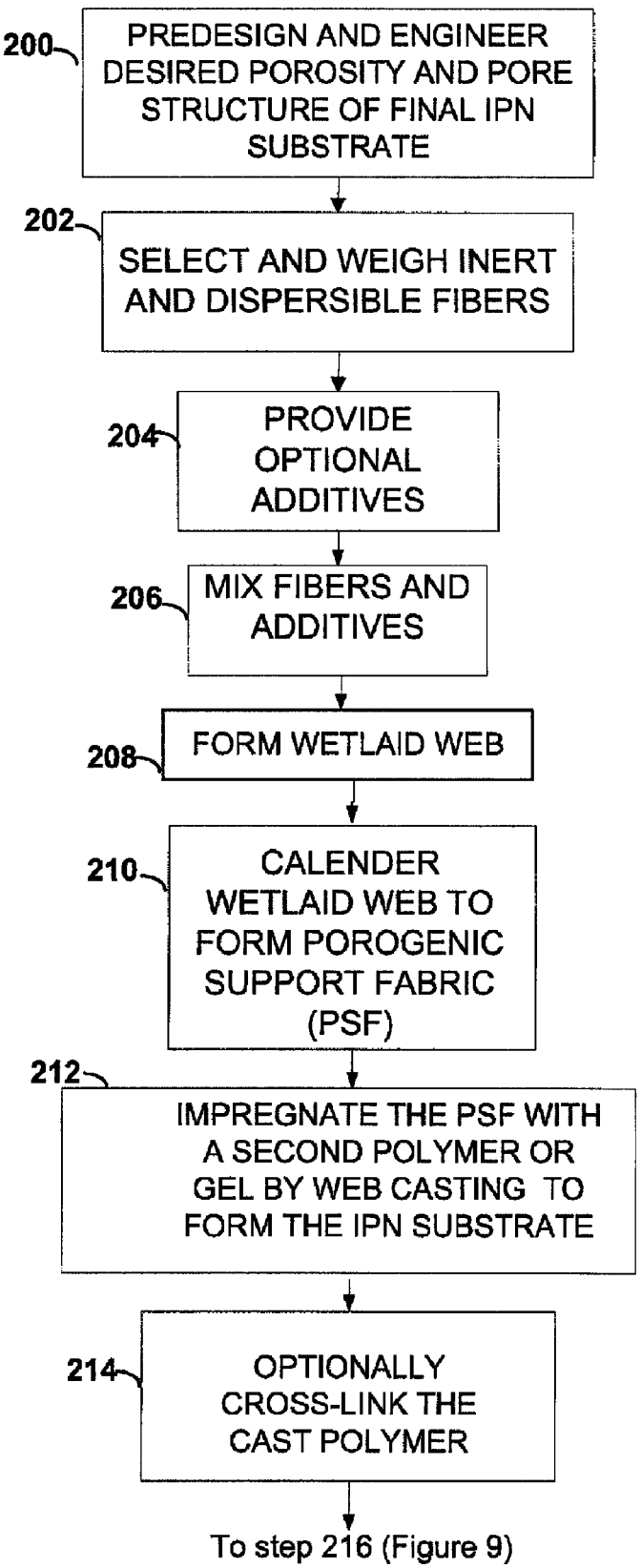
FIG. 8 is a flow diagram illustrating the steps in a process for making an Interpenetrating Polymer Network (IPN) including the process for formation of a Porogenic Support Fabric (PSF) substrate according to one aspect of the invention.
Figure 9:
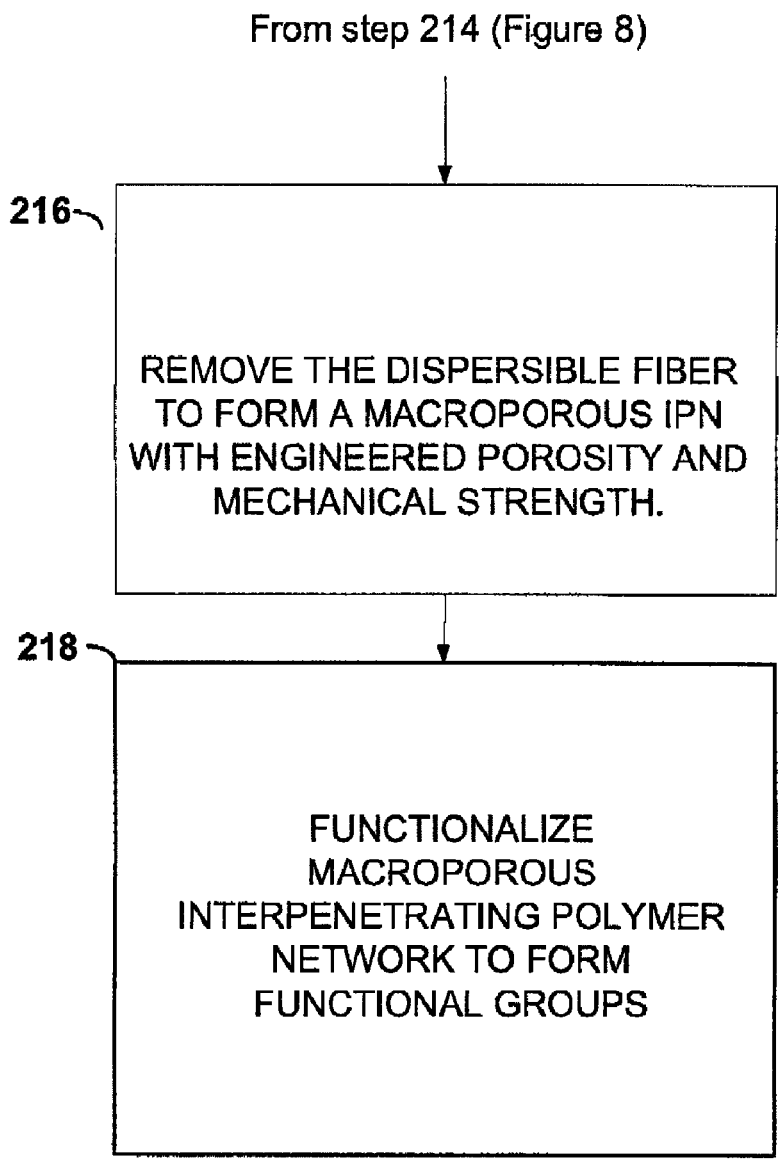
FIG. 9 is a flow diagram illustrating additional details of the process of FIG. 8 for forming a macroporous IPN with a predesigned pore structure.

FIGS. 8 and 9 show steps in an exemplary process for preparing and engineering a wet-laid nonwoven PSF substrate and using that PSF to prepare the final IPN substrate with engineered porosity and mechanical strength. The process starts at Step 200 with the selection of target physical properties for the final IPN product including the desired porosity, desired pore surface area, mechanical strength of the final macroporous IPN substrate, and type/concentration of the functional polymer (see Step 212). Thus, there are at least four independent degrees of freedom for engineering the desired target properties of the final macroporous IPN and these target properties can be estimated or predetermined based on knowledge of the final use applications, configuration of the final use device, and by persons knowledgeable with the final use needs and applications. Thus, the desired final properties for the final macroporous IPN product can be established at the beginning of the process and by engineering them into the physical characteristics of the PSF substrate.

In one embodiment of Step 200 of the process and as described in the case studies of Example 1, target properties of an interpenetrating polymer network (IPN) product can be used to engineer some of the properties of the Porogenic Support Fabric (PSF) substrate. Given certain total final IPN product characteristics such as:
 (a) desired thickness of the IPN product;
 (b) desired tensile strength of the IPN product; and
 (c) desired void volume or porosity of the IPN product.
Then, the following PSF specifications can be determined or calculated:
 (i) calendered thickness of the PSF substrate which is approximately equal to the thickness of the desired IPN ('a' above),
 (ii) volume fraction (and/or basis weight) of the inert fiber network (IFN) which is a determinant of the tensile strength of the final IFN product, (iii) volume fraction of the dispersible fiber (e.g. PLA component) which is equal to the porosity of the final IPN product, (iv) volume fraction of the functional (second) polymer (e.g. agarose) which is equal to 100% minus the combined volume fraction of inert and dispersible fiber (v) basis weight of the PSF substrate (vi) fiber weight ratio of inert to dispersible fibers which depends on the polymer density.

In this manner, weights of the various fiber materials, material basis weight for the wet-laid or dry-laid process, and final material thickness for the calendering process can be determined and thereby specified in order to manufacture the PSF substrate.

In another embodiment of this invention, the performance of the final IPN substrate can be engineered by the choice of fiber properties of the dispersible fibers including fiber diameter, fiber length, fiber shape, crimp level of fiber, fiber density, and fiber thermal properties such as melting temperature. Given a certain total dispersible fiber mass or volume, the smaller the dispersible fiber diameter (or denier), the larger the final IPN pore surface area will be since IPN pore surface area is inversely proportional to the diameter of the dispersible fiber. For example, everything else being equal, reducing the dispersible fiber diameter by a half would double the total surface area of the dispersible fiber, thus increasing the resultant IPN pore surface area. However, since, the Darcy permeability of any porous medium is proportional to the square of the pore diameter, too small a dispersible fiber diameter would require high pressures to operate a finished product. Furthermore, if the fiber diameters are too small, this may increase the difficulty for processing and making the PSF substrate since fibers with very small fiber diameters may not be commercially available. Thus, preferred fiber diameters are between about 0.1 to 1,000 micrometers, more preferably between about 1.0 to 300 micrometers, and most preferably between about 3.0 to 100 micrometers.

Also, in another embodiment, increasing the fiber length may increase the level of fiber entanglement during the making of a nonwoven fabric. However, the fiber length is also restricted by the manufacturing process itself that is selected for the preparation of the PSF substrate. In general, the preferred wet-laid process requires shorter fiber lengths while the air-laid process requires longer crimped fiber up to 76 millimeters long. Surprisingly, it is possible to use longer fibers typically only suitable for air-laid processes in our wet-laid process, partially due to our unique combination of fiber materials and processing variables. A preferred fiber length is between about 1.0 and 100 millimeters, more preferably between about 1.5 and 50 millimeters, and most preferably between about 2 and 30 millimeters depending on which short cut fiber processing method is employed.

In another embodiment, the fiber in cross-section can be of a generally round shape or of various other different regular or irregular shapes. It is generally preferably to have a fiber shape with a groove structure along the fiber length, for example star shape, to further increase the wicking effect of the composites. The short cut fiber can also be crimped to various degrees to further increase the entanglement and thus the strength of the composites, depending on which short cut fiber processing method is employed.

At step 202 (FIG. 8), the inert and dispersible staple fibers are weighed and transferred to the mixing chamber 152 (FIG. 7). At step 204, additives are optionally provided and added to the mixing chamber with the inert fibers and dispersible fibers. These additives can be well known surfactants which promote fiber mixing in aqueous solutions for the wet-laid process. In step 206, the fibers and additives can be mixed in high dilutions of 0.001 to 0.005% weight of fibers and transferred to a head box 154 (FIG. 7) designed to deliver the slurry to a moving screen-belt in the wet-laid process. In step 208, a wetlaid web is formed from the application of the aqueous suspension of fibers to a continuous web on a traveling screen 158 (FIG. 7) as a result of filtration prior to pre-drying and through-air heating 160 (FIG. 7). In step 210 the wetlaid web is calendered to form the Porogenic Support Fabric (PSF). The PSF substrate can be a non-woven fabric or a woven fabric matrix. The PSF substrate has good mechanical strength and provides a structural network subsequently used for the processes of polymer web casting, pore formation, and functionalization.

In step 212, the PSF is impregnated with the second polymer in a web casting process to form the IPN substrate. A polymer forming solution is first cast and impregnated into the PSF substrate and subsequently a stable polymer is formed on and within the PSF thereby forming the IPN product.

In another embodiment of Step 212, the polymer for the second polymer network can be agarose which has been impregnated into the PSF substrate at concentrations between 0.1% to 10%, more preferably between 1-8%, and most preferably between 3-6%.

In another embodiment of Step 212, the polymer for the second polymer network can be agarose which has been impregnated into the PSF substrate at concentrations between 0.1% and 10%, more preferably between 1% and 8%, and most preferably between 3% and 6% followed by optional cross-linking in step 214 with epichlorohydrin or other cross-linking agents known to those skilled in the art.

In another embodiment of Step 212, the polymer for the second polymer network can be polyacrylamide which has been impregnated into the PSF substrate at concentrations between 0.1% to 30%, more preferably between 1-20%, and most preferably between 5-15%

At step 214, the cast polymer is optionally cross-linked. It will be appreciated, that the decision whether to cross-link can depend on the monomers used in the process as is known in the art. The process continues at step 216 in FIG. 9 where the dispersible fiber network is dissolved and removed as the final step in generating the desired, predesigned porosity. Finally in step 218 the macroporous IPN is modified by treating the macroporous IPN with functional chemical moieties, for example, adding ligands (e.g., chromatographically functional reagents) to form functional groups covalently linked to the second polymer of the IPN product. The pore sizes of the IPN are advantageously much larger that of the ligand molecules to prevent blockage. These functional groups can be ion exchange groups and other ligands which are well known to persons knowledgeable in the art such as sulfopropyl- (SP), carboxymethyl- (CM), aminomethyl- (AE), diethylaminoethyl- (DEAE), trimethylaminoethyl- (Q) and ligands such as Protein A, Protein G, and surface modifiers such as dextran, cellulose, and others. In this manner, the final IPN substrate can be prepared with engineered porosity resultant from dispersal and removal of the DFN, mechanical strength resultant from the remaining IFN within the IPN polymer casting and chemical groups suitable for specific applications resultant from the final functionalization chemistries.

One embodiment of the present invention relates to the preparation of nonwoven or woven sheets for use as PSF substrates in the preparation of IPN substrates suitable for use in fluid filtration, including the filtration of liquids and gases, the IPN substrates being made by casting a polymer forming solution onto and throughout the PSF substrate matrix and subsequently or simultaneously removing the DFN from the composite material.

The PSF substrate of the invention can have one of a few different structures. The PSF substrate can be a wetlaid nonwoven fabric, or an airlaid nonwoven fabric, or a spunbond fabric, or a meltblown fabric or any of a number of other well-known nonwoven or woven fabric structures having a mixture of inert and dispersible fibers. In each embodiment, the PSF substrate provides two or more interconnected fiber networks with distinct properties wherein one network, made up of the dispersible fibers, can be removed after impregnating the PSF substrate with a polymer forming solution. In this manner, a permeable structure can be created throughout the impregnated polymer. Furthermore, the impregnated second polymer network can be supported on the remaining IFN such that the IFN provides structural support to the resultant IPN substrate and the final IPN substrate thereby has suitable, mechanical strength and engineered porosity for fluid filtration of liquids and gases.

In one embodiment, the PSF substrate can be a wet-laid fabric. As shown in FIG. 7, this structure may be formed by adding staple fibers and to an aqueous solution which the fibers are suspended uniformly in water, mixing the solution in the mixing tank 152 at very high dilutions of 0.001 to 0.005% weight of fibers, and transferring the solution to a head box 154 designed to apply the solution to a moving collection belt 156 in the wet-laid process in which an aqueous suspension of fibers can be used to form a continuous web on a traveling screen as a result of filtration prior to pre-drying and through-air heat bonding and/or by squeezing between rolls 160 to remove most of the water from the substrate. The resulting wet-laid fabric 161 has relatively isotropic properties with a mean pore size of between about 1 micrometer and about 100 micrometer. The resulting wet-laid fabric 161 can be collected after drying by passing it through an oven for further use or can be fed into the next processing step in a continuous manner.

In another embodiment the IPN is defined as a material comprised of a first polymer network which is present as an interconnected fibrous composite and having dimensions from about 0.1 to 50 micrometers in diameter and a second polymer network which is interlaced with the first polymer network on a molecular scale of size and dimensions.

In another embodiment, the PSF substrate can be an airlaid fabric. This structure may be formed using a well known process in which an aerodynamic process of fiber blending, layering, and web formation can be used to apply a mixture of staple fibers onto a traveling screen to form a continuous web prior to drying and bonding of the substrate by methods such as needle punching, thermal bonding, chemical bonding, hydroentanglement, and other well known methods. The air-laid web layer has a mean pore size of between about 1 micrometer and about 100 micrometer.

In another embodiment, the PSF substrate can be a spunbond fabric. This structure may be formed by melt spinning fibers onto a moving collection belt in a process having multiple consecutive spinning beams in which the spinning beams may differ in terms of spinning conditions such as spinneret hole size, spacing, and fiber composition. The spunbond fibers have a diameter between about 10 micrometer and about 25 micrometer, advantageously between about 15 micrometer and about 20 micrometer. The spunbond layer has a mean pore size of between about 1 micrometer and about 100 micrometer.

In yet another embodiment of the invention, the PSF substrate can be a fabric comprising a meltblown structure wherein high velocity air or other appropriate force can be used to attenuate the fibers as they are extruded from an polymer extruder and die assembly in which the extruder channels may differ in terms of extrusion conditions such as hole size, spacing, and fiber composition. The meltblown layer has a mean pore size of between about 1 micrometer and about 100 micrometer.

The PSF substrate can be formed of any polymeric materials having the appropriate properties for the particular application of the resulting fibrous composite, e.g., thermal resistance, chemical resistance, biocompatibility and compatibility with post-treatments such as curing, drying and thermobonding. Suitable polymers for the fibers used to prepare the PSF substrate include but are not limited to polyethylene terephthalate, polylactic acid, polyhydroxyalkanoates, polyethylene, polypropylene, polyacrylonitrile, polyvinylidene difluoride, polyvinyl alcohol, polystyrene, polysulfone, polyether sulfone, polycarbonate, polyimide, aromatic polyamides, aliphatic polyamides, polyphenylene sulfide and polyvinyl chloride.

The inert non-dispersible fiber components 20 (FIG. 2) of the PSF substrate can be, for instance, polyethylene terephthalate (PET), polypropylene (PP), polyethylene (PE), a combination of PET and PP or PE, or a combination of PET and a copolymer of PET (coPET), either as bicomponent fibers or as a blend of fibers. The use of PET/PP, PET/PE or PET/coPET combinations has been found to improve the bonding process of the PSF substrate. Using polymers having slightly different melting temperatures allows the retention of the fiber strength of the higher melting polymer component, the PET component, while allowing the lower melting polymer component, the PE, or coPET or PP component, to flow in order to create adequate bond points during thermobonding and calendering operations.

The dispersible fiber components of the PSF substrate can be, for instance, polylactic acid (PLA) homopolymer or a combination of PLA homopolymer and a bicomponent fiber comprised of a lower melting PLA sheath component and a higher melting PLA core component or as a blend of fibers which can be dissolved after casting of the polymer forming solution. The use of PLA/PLA bicomponent combinations has been found to improve the bonding process of the PSF substrate and provides an interconnected fiber network of the dispersible fiber network (DFN) after thermobonding operations and at the bond points created during thermobonding and calendering operations. Using polymers having slightly different melting temperatures allows the retention of the fiber strength of the higher melting polymer component, the PLA core component, while allowing the lower melting polymer component, the PLA sheath component, to flow in order to create adequate bond points during thermobonding and calendering operations. In most cases, other suitably dispersible polymers such as polyvinyl alcohol (PVA) and polyhydroxyalkanoate (PHA) and others can be substituted for the PLA homopolymer and/or PLA bicomponent fiber materials. Other dispersible fiber materials such as fiber based on lactides, lactones, carbonates and oxalates can be utilized.

In another embodiment of the invention, the melting temperature difference between the lower melting temperature component of the inert fibers and the lower melting temperature component of the dispersible fibers is preferably less than 25° C.;

more preferably less than 10° C.; and most preferably less than 5° C. This temperature difference would ensure sufficient mechanical strength provided by the unmelting and melting components to form a strong interlocking network between the IFN and DFN and for the subsequent polymer casting and final applications.

In another embodiment of the invention, the fiber size difference for the fibers used to make the PSF material as defined by the denier per fiber ratio (Rdpf) between the denier per fiber of the inert fibers and the denier per fiber of the dispersible fibers is preferably between less than 2.5 and greater than 0.4; more preferably between less than 2 and greater than 0.5; and most preferably between less than 1.6 and greater than 0.625. This Rdpf or the proper fiber size difference would ensure sufficient mechanical strength provided by the efficient entanglement to form a strong interlocking network between the IFN and DFN and for the subsequent polymer casting and final applications.

In another embodiment of the invention, the fibers used to make the PSF material are short cut fibers typically less than about two inches in length. The fiber length difference in this invention as measured by the average fiber length ratio (Rafl) between the average fiber length of the inert fibers and the average length of the dispersible fibers is preferably between less than 3 and greater than 0.33; more preferably between less than 2 and greater than 0.5; and most preferably between less than 1.6 and greater than 0.625. This Rafl or proper fiber length difference would ensure sufficient mechanical strength while forming proper permeation channels provided by the efficient entanglement and to form a strong interlocking network between the IFN and DFN and for the subsequent polymer casting and final applications. Also, this Rafl would ensure uniform mixing of the fibers during the air-laid or wet-laid process resulting in a homogeneous fiber composite wherein the fibers are uniformly intermixed.

In another embodiment, the PSF material is made using fibers for the IFN and the DFN each of which is comprised at least partially from thermobondable materials. The thermobondable materials having melt temperatures from about 50 degrees Centigrade to about 250 degrees Centigrade or within a range of temperature that makes it possible to perform a thermobonding process such as the calendering process at a single temperature sufficient to simultaneously thermobond fibers of the IFN and the DFN thus creating interconnected networks for both the IFN and DFN in a single step.

In another embodiment, the PSF material has a basis weight of between 30 to 150 grams per square meter.

In another embodiment, the PSF material has a thickness of between 50 to 500 micrometers.

In another embodiment, the PSF material has a Frazier air permeability at 0.5" of water of between 10 and 700 cubic feet per minute.

In another embodiment, the PSF material including the IFN and the DFN has a tensile strength of between 1 and 10 pounds/inch (MD) and between 1 and 10 pounds/inch (CD).

In another embodiment, the PSF material after being treated to remove the DFN leaving only the IFN has a tensile strength of between 1 and 10 pounds/inch (MD) and between 1 and 10 pounds/inch (CD).

In another embodiment, the PSF material has a mechanical strength difference measured by the ratio (Msr) of the strength of the PSF to the strength of the PSF after removal of the DFN that is preferably between less than 5 and greater than 0.1; more preferably between less than 2 and greater than 0.5; and most preferably between less than 1.6 and greater than 0.625. This Msr would ensure sufficient mechanical strength of the PSF suitable for the polymer casting operations necessary to prepare the initial IPN material and with suitable mechanical strength for the final macroporous IPN substrate in a format that is suitable for the final applications.

In one embodiment as described in Example 2, the fiber mixing and preparation process steps 200, 202, 204, 206, and 208 were performed at Southeast Nonwovens, Inc. (102 Industrial Park Lane, Clover, S.C. 29710) using their 21-inch wide wet-laid forming equipment in order to prepare a lightly thermobonded wet-laid fabric 161 (FIG. 7). Short cut inert staple fiber 20 (FIG. 2) and short cut dispersible staple fiber 22 (FIG. 2) were obtained from MiniFibers Inc. (2923 Boones Creek Rd., Johnson City, Tenn., 37615), Fiber Innovations Technology (398 Innovation Drive, Johnson City Temm. 37604), and Far Eastern Textile Ltd. (2 Tun Hwa S.Rd., Taipei, Taiwan, China).

In another embodiment as described in Example 3, calendering for the porogenic support fabric formation process was performed on lightly thermobonded, wet-laid fabric (prepared at Southeast Nonwovens Inc. and described above) using B.F. Perkins calendering equipment at Standex Engraving Group (5901 Lewis Rd., Sandston, Va. 23150-2413).

Another embodiment is described in Example 4 which describes a polymer casting operation for impregnating a polymer forming solution into a PSF substrate to form an IPN. In this example, a 3% (w/w) agarose solution is prepared by adding agarose to 0.089M Tris-Borate pH 8.1 and boiling the solution for at least 5 minutes in order to dissolve the agarose. The resulting hot agarose solution is transferred to a casting bath which has means for mixing and means for heating to a constant temperature of about 70° C. A web transport system is used to move the PSF substrate 24 in roll-form through the heated casting bath at a controlled rate of about 12 inches per minute. The resulting IPN 34 (FIG. 3) is collected in roll-form and stored.

Another embodiment is described in Example 5, wherein the agarose IPN of Example 4 is treated with epichlorohydrin in 0.5N NaOH at 55° C. for two hours. In this case, the reaction conditions are ideal for both (a) cross-linking the agarose and (b) simultaneous dispersal of the DFN which may include base labile, polylactic acid (PLA) fibers. The advantageous combination of cross-linking and DFN removal in a single operation enhances the overall process efficiency. The resulting macroporous IPN with cross-linking is collected in roll-form and stored.

Another embodiment is described in Example 6, wherein the macroporous, cross-linked agarose IPN substrates of Example 4 and 5 were tested for hydraulic permeability. These results demonstrate that the dispersal and removal of the DFN results in the creation of a macroporous network and a 200-fold improvement in Darcy permeability.

Another embodiment is described in Example 7 which describes a polymer casting operation for impregnating a polymer forming solution into a PSF substrate and into a commercially available nonwoven fabric. In this example, a 10% polyacrylamide-bisacrylamide polymer forming solution was prepared and was impregnated into a PSF support containing 25% by weight of dispersible fiber and, separately, into a common nonwoven made totally from inert fibers and containing no dispersible fiber network. In a related embodiment as described in Example 8, the IPN substrates prepared in Example 7 were tested for hydraulic permeability before and after treatment under conditions for selective dissolution and removal of the DFN. The results demonstrate that the dispersal of the DFN results in the creation of a macroporous network and a 320-fold improvement in Darcy permeability.

In another embodiment, additional reaction baths such as 174 (FIG. 7) containing functional ligands can be added to the process for necessary and appropriate chemical processing steps relative to preparing the desired final IPN 54 (FIG. 5).

Another embodiment is described in Example 9, wherein the macroporous, cross-linked agarose IPN prepared in Example 7 is functionalized by treatment with propane sultone in 0.5N NaOH at 55° C. for two hours. In this case, hydroxyl sites on the agarose polymer are functionalized with sulfopropyl groups. The resulting IPN substrate such as 54 (FIG. 5) with cross-linking, engineered porosity, and functional groups is collected in roll-form and stored.

Another embodiment is described in Example 10, wherein the macroporous, cross-linked agarose IPN prepared in Example 7 is functionalized by treatment with glycidyltrimethylammonium chloride (G-MAC, 70%) in 0.25N NaOH at 55° C. for two hours. In this case, hydroxyl sites on the agarose polymer are functionalized to introduce quaternary.aminomethyl groups (Q-groups) and to form an anion exchanger. The resulting IPN substrate such as 54 (FIG. 5) with cross-linking, engineered porosity, and functional groups is collected in roll-form and stored.

Another embodiment is described in Example 11, wherein the macroporous, cross-linked agarose IPN such as 54 (FIG. 5) and functionalized by sulfopropyl groups as described in Example 8 is used as an ion exchange sorbent for chromatographic separation and isolation of lysozyme.

Another embodiment is described in Example 12, wherein the macroporous, cross-linked agarose IPN such as 54 (FIG. 5) and functionalized by sulfopropyl groups as described in Example 8 is used as an ion exchange sorbent for chromatographic separation and isolation of Human immunoglobulin proteins.

Another embodiment is described in Example 13, wherein the macroporous, cross-linked agarose IPN such as 54 (FIG. 5) and functionalized by quaternary amino groups as described in Example 10 is used as an ion exchange sorbent for chromatographic separation and isolation of bovine serum albumin.

Another embodiment is described in Example 14, wherein the macroporous, cross-linked agarose IPN such as 54 (FIG. 5) is first functionalized in a condensation reaction with glycidol to prepare a macroporous IPN substrate with functional diol groups. The diol containing substrate was further functionalized in an oxidation reaction to prepare a macroporous IPN substrate with functional aldehyde groups. The aldehyde containing substrate was further functionalized in a reductive amination reaction with Protein-A to form a macroporous, cross-linked agarose IPN Protein-A affinity substrate suitable for chromatographic separation and isolation of immunoglobulins such as IgG and monoclonal antibodies.

Another embodiment is described in Example 15, wherein the macroporous, cross-linked agarose IPN Protein-A affinity substrate such as 54 (FIG. 5) prepared in Example 12 is used as an affinity sorbent for chromatographic separation and isolation of Human IgG.

Another aspect of this invention relies on the discovery that certain physicochemical processes can densify the second functional polymer network after its impregnation into the PSF substrate. Densification refers to increasing the density of the second polymer network after it is exposed to the densification process. When the second polymer network densifies it shrinks, creating additional space previously occupied by the second polymer network. When the densification process is carried out after having impregnated the PSF substrate with the second polymer network, the densification creates new flow passages not available before densification, resulting in an increased hydraulic permeability of the IPN composite media. Example 16 describes a process for freeze-thawing and Example 17 describes a process for freeze-drying leading to densification of the functional polymer and increased hydraulic permeability of the macroporous IPN. Air drying may also be a densification process. Some of these processes may require "fixing" the second polymer network to keep it from completely collapsing, as for example, by means of crosslinking. In one embodiment, the macroporous IPN is treated by freeze-thawing or freeze-drying.

In another embodiment, the adhesion of the polymer forming solution to the PSF substrate can be improved by improving the affinity of the polymeric casting solution for the PSF substrate by the addition of well known surfactants such as Triton X-100, Tween-20, and others. Also, the affinity of the PSF substrate for the polymeric casting solution can be improved via corona treatment or traditional methods such as spraying with binders or other surfactants.

The IPN substrates may be cross-linked if desired by any of the chemistries commonly used in the industry to cross-link specific polymers. Cross-linkers used for polysaccharides containing multiple hydroxyl groups are chemistries, being as non-limiting examples, epichlorohydrin or other multifunctional epoxy compounds, various bromyl chemistries or other multifunctional halides; formaldehyde, gluteraldehyde and other multifunctional aldehydes, bis(2-hydroxyethyl-)sulfone, dimethyldichloro-silane, dimethylolurea, dimethylol ethylene urea, diisocyanates or polyisocyanates and the like.

A suitable reagent used to remove the DNF is preferably compatible to the cross-linker chemistry selected above as in Example 5 so that the removal of the DNF and the formation of the cross-linking can be achieved in one step. However, the steps can also be done separately depending on the optimal cross-linking chemistry chosen by one knowledgeable in the art. In one embodiment, suitable reagents for a gelated agarose polymer include but are not limited to 0.5N sodium hydroxide or methylene chloride after solvent exchange steps using various concentrations of ethanol or methanol.

Suitable functional ligands can be ion-exchange ligands or affinity ligands. The ion-exchange ligands include but are not limited to ligands such as sulfopropyl- (SP), carboxymethyl- (CM), diethyllaminoethyl- (DEAE), aminomethyl- (AM), and quarternary trimethylamino- (Q) moieties. The affinity ligands include but are not limited to Protein-A, Protein-G, etc.

The IPN substrates may have one or more functionalities applied to it, including ligands such as Protein A or Protein G, natural or recombinatorily derived versions of either, modified versions of protein A or G to render them more caustic stable and the like, various chemical ligands such as 2-aminobenzimidazole (ABI), aminomethylbenzimidazole (AMBI), mercaptoethylpyridine (MEP) or mercaptobenzimidazole (MBI), or various chemistries that render the polymer cationic, anionic, philic, phobic or charged, as is well-known in the art of chromatography.

Functional groups used in liquid chromatography that are adaptable to the present invention include groups such as, but not limited to, ion exchange, bioaffinity, hydrophobic groups, groups useful for covalent chromatography, thiophilic interaction groups, chelate or chelating groups, groups having so called pi-pi interactions with target compounds, hydrogen bonding, hydrophilic groups, etc.

Pore Structure Features and Benefits.

Use of a PSF and the DFN to create a macroporus IPN substrate results in a number of unique features and benefits. Dissolution and removal of the DFN provides a pore structure that is macroporous and interconnected at the cross-over points of the fibers 43 (FIG. 4). In addition, the interconnected pores created by removal of the DFN are tubular shaped channels within the IPN having a cross sectional diameter that is equal to the cross sectional diameter of the DFN fibers. Also, the length of these tubular shaped channels is at least approximately the length of the dissolved (or dispersible) fibers used to make the PSF, and due to the shape and interconnected nature of these fibers, the channel structure permeates the IPN substrate in a mostly lateral direction. This is due to the fact that typical processes for making non-woven or woven fabrics result in the deposition of fibrous materials in a flat sheet format. Accordingly, the majority of the fibers comprising the PSF are deposited in a lateral orientation to each other meaning that they are lying on their sides (or longitudinal direction) and/or lying in a flat plane with a minority of fibers in the vertical or z-direction to the flat sheet. Thus, the removal of the DFN results in a unique interstitial void volume or pore structure which is substantially cylindrical in shape and interconnected throughout the IPN and which facilitates uniform permeation of fluids throughout the IPN matrix.

The surface area of the pore structure of the IPN substrate can be determined and engineered simply by the adjusting the amount and physical characteristics of the DFN fibers. As shown in Example 2, the PLA bicomponent fiber was 4.0 dpf×6 millimeters length and the PLA homopolymer fibers were 1.3 dpf×⅛" length. The diameter of the fibers in micrometers can be calculated using the density of PLA (1.25 gm/cm$^3$) as follows:

$$\text{Diameter} = 11.89 \times (\text{dpf/density})^{1/2}$$

Thus, for the PSF materials described in Example 2, the bicomponent diameter is 21.3 micrometers and the homopolymer diameter is 12.1 micrometers. Thus, the individual fiber surface area and fiber count ratio can be calculated depending on the blend ratio of fiber types. In this manner, the precise structure and total surface area per unit volume of the interconnected pore structure in the final IPN can be determined.

Thus, the amount and structure of dispersible fiber is directly related to the physical properties and structure of the DFN which is, accordingly, directly related to the total porosity of the macroporous network. Furthermore, the structure and amount of inert fiber is directly related to the physical properties of the IFN and, thereby, to the resultant mechanical strength and inert, non-functional percentage of the final IPN. As shown in Example 1, desired PSF material basis weight, fiber blend weight ratios, and final calendered material thickness for preparing a suitable PSF substrate can be determined based on the desired properties of the final IPN product such as (a) void volume or porosity, (b) volume fraction of inert fiber, and (c) volume fraction of the functional polymer. Accordingly, desired features of the final IPN substrate can be predesigned and engineered thus eliminating the need for extensive experimentation which is commonly required for preparing porous composite sheet materials using well known porogens added to the polymer forming solution.

Numerous other technologies utilize porogens to create a macroporous structure of a functional polymer use methods that commonly rely on a polymerization phenomena known as 'nucleation and growth" or 'microgelation'. Use of this technology leads to a macroporous structure of the functional polymer which is, by design, full of holes with a wide pore size distribution. The result is a fragile polymer and with random pores of undefined shape and connectivity. Also, it is well known by those experienced in the art that a wide pore size distribution is obtained in materials prepared by nucleation and growth. And, the pore surface area per unit volume by these methods is unpredictable and necessitates extensive trial and error experimentation.

Adsorptive Chromatographic Media (ACM) such as the materials described here are useful in a wide variety of applications such as concentration of biological molecules, pharmaceuticals and biopharmaceuticals processing, fermentation, laboratory analytical uses, providing ultrapure water necessary in food and beverage, providing pure water for the chemical and pulp and paper industries, filtering seawater to yield potable water as well as a variety of other industrial applications including waste treatment, oil emulsion waste treatment, treatment of whey in dairy industries, micro-electronics manufacturing. The ACM's can be also useful to remove contaminants from gases including, but not limited to, air, nitrogen, helium, carbon dioxide, oxygen, argon, acetylene, hydrogen, and carbon monoxide.

Test Methods.

In the description above and the examples that follow, the following test methods are employed to determine various reported characteristics and properties. ASTM refers to the American Society for Testing and Materials. TAPPI refers to Technical Association of Pulp and Paper Industry.

Basis Weight is a measure of the mass per unit area of a fabric or sheet and is determined by ASTM D-3776, which is hereby incorporated by reference, and is reported in g/m$^2$.

Melting Temperature (also referred to as the melting point) of a polymer as reported herein is measured by differential scanning calorimetry (DSC) according to ASTM D3418-99, which is hereby incorporated by reference, and is reported as the peak on the DSC curve in degrees Centigrade. The melting point was measured using polymer pellets and a heating rate of 10° C. per minute.

Shore D Hardness is a measure of rubber hardness and is measured according to ASTM D 2240, which is hereby incorporated by reference.

Thickness of the nonwoven materials is measured by TAPPI-T411 om-97, which is hereby incorporated by reference.

Elmendorf Tear is a measure of the force required to propagate an initiated tear from a cut or a nick. Elmendorf Tear is measured according to ASTM D1424, which is hereby incorporated by reference, in both the machine direction (MD) and the cross direction (XD) and is reported in units of lb or N.

Strip Tensile Strength is a measure of the breaking strength of a sheet and was measured according to ASTM D5035, which is hereby incorporated by reference, and is reported in units of lb or N. Five measurements were made and averaged in both the machine direction and the cross direction.

Frazier Air Permeability is a measure of the air permeability of a sheet and was measured according to ASTM D 737, and reported in units of m$^3$/min/m$^2$ or cubic feet per minute.

Mean Pore Size and Pore Size Distribution were measured by a capillary flow porometer model number CFP-34RT-FXA-3-6-L4, available from Porous Materials, Inc. (Ithaca, N.Y.), following test method ASTM E1294.

Trap Tear Strength is a measure of the force required to propagate an initiated tear, and was measured according to ASTM D5733-90.

Grab Tensile Strength is a measure of breaking strength of a sheet and was measured by ASTM D5034-90.

EXAMPLES

The present examples are provided for illustrative purposes only, and are not to be construed as limiting the present invention as defined by the appended claims. All references given below and elsewhere in the present specification are hereby included herein by reference.

1. Engineering Case Studies for composition/porosity detm. of PSF
2. Preparation of Thermobonded Wedlaid nonwoven
3. Preparation of Calendered Porogenic Support Fabric
4. Agarose Casting with a Porogenic Support Fabric to form an IPN substrate
5. Preparation of a porous IPN: Crossliking and simultaneous pore formation
6. Permeability and flux of IPN agarose IPN substrates
7. Polyacrylamide casting with a PSF and a common nonwoven to form IPN substrates
8. Polyacrylamide IPN substrates and permeability tests
9. Preparation of an agarose IPN substrate with SP groups
10. Preparation of an agarose IPN substrate with Q groups
11. Binding of lysozyme to SP functionalized agarose IPN substrate
12. Binding of hlgG to SP functionalized agarose IPN substrate
13. Binding of BSA to Q functionalized agarose IPN substrate
14. Preparation of Protein-A functionalized agarose IPN substrate
15. Use of Protein A functionalized agarose IPN substrate for hlgG isolation.
16. Freeze Drying of the Macroporous IPN
17. Freeze Thawing of the Macroporous IPN Example 1

Engineered Porosity for Predesigned Pore Formation: Case Studies for the Macroporous Properties of a Porogenic Support Fabric (PSF) and a Resulting Interpenetrating Polymer Network (IPN)

Target properties of an interpenetrating polymer network (IPN) product were used to engineer the Porogenic Support Fabric (PSF) substrate. Material basis weight, fiber blend weight ratios, and final calendered material thickness for manufacturing a suitable PSF substrate were derived based on the desired properties of the final IPN product such as (a) void volume or porosity, (b) volume fraction of inert fiber, and (c) volume fraction of the functional polymer.

As shown in the case studies below, material thicknesses from 100-600 micrometers were evaluated with an inert fiber network (IFN) fixed at 5% (and 10%) volume fraction of the final IPN substrate and a dispersible fiber network (DFN) fixed at 35% volume fraction of the final IPN substrate. These data were derived based on (a) the known densities of the inert fiber (PET=1.38 g/cm$^3$) and dispersible fiber (PLA=1.25 g/cm$^3$) and (b) the assumption that the volume fraction of the dispersible fiber is equal to the void volume or total porosity of the final IPN substrate.

For Case 1, the void volume equivalent of the IPN substrate (equal to the PLA volume) was set at 35% (typical of a conventional chromatography column) and the inert fiber volume was set at 5% volume fraction. Accordingly, this results in IPN substrates that are composed of 60% volume fraction of the functional polymer or about 7.7% less than a typical chromatography column. Thus, as shown in example C for a final PSF substrate that is 300 micrometers thick, the ideal basis weight of the PSF substrate is 152 gm/m$^2$ with a PLA to PET weight ratio of 6.3. In this manner, the necessary parameters to control a nonwoven manufacturing process for making the PSF material can be established. Case 2 is a comparative analysis for an IPN substrate that would be expected to have substantially more mechanical strength by increasing the inert fiber volume to 10% volume fraction. Accordingly, this will result in an IPN substrate that is composed of 55% volume fraction of the functional polymer or about 15.4% less than a typical chromatography column.

Case 1.

|  |  |  | A | B | C | D | E | F | Conventional Chromatography Column |
|---|---|---|---|---|---|---|---|---|---|
| IPN Thickness | $t_{NW}$ | microns | 100 | 200 | 300 | 400 | 500 | 600 | |
| Volume % Inert | $f_{REBAR}$ | % | 5% | 5% | 5% | 5% | 5% | 5% | 0% |
| Volume % void | $f_{PLA}$ | % | 35% | 35% | 35% | 35% | 35% | 35% | 35% |
| Volume % polymer | $f_{AGR}$ | % | 60% | 60% | 60% | 60% | 60% | 60% | 65% |
| PSF Basis Weight | $rho_{NW}$ | gm/m$^2$ | 51 | 101 | 152 | 203 | 253 | 304 | |
| PSF Fiber Ratio | $R_{NW}$ | Wgt. Ratio | 6.3 | 6.3 | 6.3 | 6.3 | 6.3 | 6.3 | |

Case 2.

|  |  |  | A | B | C | D | E | F | Conventional Chromatography Column |
|---|---|---|---|---|---|---|---|---|---|
| IPN Thickness | $t_{NW}$ | microns | 100 | 200 | 300 | 400 | 500 | 600 | |
| Volume % Inert | $f_{REBAR}$ | % | 10% | 10% | 10% | 10% | 10% | 10% | 0% |
| Volume % void | $f_{PLA}$ | % | 35% | 35% | 35% | 35% | 35% | 35% | 35% |
| Volume % polymer | $f_{AGR}$ | % | 55% | 55% | 55% | 55% | 55% | 55% | 65% |
| PSF Basis Weight | $rho_{NW}$ | gm/m$^2$ | 58 | 115 | 173 | 230 | 288 | 345 | |
| PSF Fiber Ratio | $R_{NW}$ | Wgt. Ratio | 3.2 | 3.2 | 3.2 | 3.2 | 3.2 | 3.2 | |

Example 2

Preparation of Thermobonded, Wet-Laid Nonwoven Fabric

Thermobonded, wet-laid nonwoven fabrics were prepared using a pilot scale 21-inch wide wet-laid forming line and an on-line, through-air drying oven at Southeast Nonwovens, Inc. (102 Industrial Park Lane, Clover, S.C. 29710). As shown in Table 1, fiber blends were prepared by mixing ten pounds of short-cut fiber in 450 gallons of water. Short cut inert fiber and short cut dispersible fiber were obtained from MiniFibers Inc. ((MF) 2923 Boones Creek Rd., Johnson City, Tenn., 37615), Fiber Innovations Technology ((FIT)398 Innovation Drive, Johnson City Tenn. 37604), and Far Eastern Textile Ltd. ((FET) 2 Tun Hwa S.Rd., Taipei, Taiwan, China), and William Barnet LLC ((B), 1300 Hayne St., Arcadia, S.C. 29320). As shown in Table 2, various transport speeds were used for the moving collection belt resulting in material basis weights from 73 to 165 gram/meter$^2$. Through-air thermobonding was performed at 235° F. resulting in drying with minimal shrinkage (0-14% mat width) and roll-up collection of mechanically stable, lightly thermobonded materials which were approximately 1-4 millimeters thick depending on transport speed and associated basis weight.

Thermobonded, wet-laid fabrics were prepared with various ratios of dispersible to inert fiber (2:1, 1:1, 3:1, and 1:4). Except for Run 5, the total bicomponent fiber was kept at or below 35% of the total fiber weight in order to minimize mat shrinkage after drying and through-air thermobonding. In most cases, a low melting (110° C.) polyethylene homopolymer binder fiber was included in the fiber blend at 14% of the total fiber weight in order to create a stable, lightly thermobonded material.

Example 3

Preparation of Calendered Porogenic Support Fabric

The thermobonded, wet-laid nonwoven fabric from Example 2 (Table 1, Run-4), was converted to an 8-inch wide roll-up and calendered by passing it through a B.F. Perkins calendering system at Standex Engraving Group (5901 Lewis Rd., Sandston, Va. 23150-2413). One of the calendering rollers was a heated steel roll having a non-stick, Tribocoat™ finish (nickel/Teflon plating) and a second resilient (back-up) roll with a surface of a heat resistant (HR) cotton. The second roller was unheated and had a Shore D hardness of about 80. In this manner, a calender nip was formed by pressing the two rollers against each other. Various pressures, temperatures, and feed rates were tested in order to optimize conditions that would provide a final material that was 300-350 micrometers thickness, with a Frazier Air Permeability of about 50 cfm at 0.5" water, with Strip Tensile Strength (md and cd)>4 pounds/inch, and with rough and raised fibers on both surfaces. Optimal conditions were subjectively determined to be a nip pressure of 500 pounds per linear inch, roller temperature at 146° C., and material feed rate of 16 feet per minute.

Example 4

Agarose Casting with a Porogenic Support Fabric to Form an IPN Substrate

A 3% agarose solution in 0.089M Tris-Borate buffer pH 8.3 was prepared by adding 120 grams of agarose powder (SeaKem LE, p/n 50004, Lonza, Rockland, Me.) to 3,840 grams of water and 40 grams of 10×TBE Buffer (Promega, p/n V4251, Madison, Wis.). The mixture was brought to boiling for 5 minutes in a microwave oven and the solution was transferred to a thermostated casting bath having means

TABLE 1

| | MATERIALS/Specs/Sources | | | | | Nonwoven Tests Formulations | | | | |
|---|---|---|---|---|---|---|---|---|---|---|
| Fiber # | Description | P/N | Size-Lgth | Source | MP °C. | Run-1 lbs | Run-2 lbs | Run-3 lbs | Run-4 lbs | Run-5 lbs |
| 1 | PLA homopolymer | PLSTD-013NRR-350, | 1.3 dpf × ⅛" | MF | 165 | 5.2 | 4.0 | 6.0 | 2.0 | 2.6 |
| 2 | PLA BiCo | SLA2440CMC | 4 dpf × 6 mm | FET | 130-165 | 1.3 | 1.0 | 1.5 | 0.5 | 3.9 |
| 3 | PET BiCo | T-201 | 3 dpf × ¼" | FIT | 110-140 | 2.1 | 2.5 | 1.1 | 3.0 | 2.1 |
| 4 | PET homopolymer | PSSTD-0304LH-0600 | 3 dpf × ¼" | MF | 227-232 | | 1.1 | | | |
| 5 | PE homopolymer | PELPE-060NLR-0300 | 5 dpf × ⅛", | MF | 110 | 1.4 | 1.4 | 1.4 | 1.4 | 1.4 |
| 6 | PET homopolymer | SENW | 0.5 dpf × ¼" | B | 250+ | | | | 3.1 | |
| | Total Fiber/450 Gal. | | | | | 10.0 | 10.0 | 10.0 | 10.0 | 10.0 |

TABLE 2

| Fiber Ratios, Conditions, and Results | Run-1 | Run-2 | Run-3 | Run-4 | Run-5 |
|---|---|---|---|---|---|
| PLA-homo % | 52% | 40% | 60% | 20% | 26% |
| PLA-bico % | 13% | 10% | 15% | 5% | 39% |
| Total Bico % | 34% | 35% | 26% | 35% | 60% |
| PET-homo % | 0% | 11% | 0% | 31% | 0% |
| PET-bico % | 21% | 25% | 11% | 30% | 21% |
| PE Binder | 14% | 14% | 14% | 14% | 14% |
| Total PLA % = DFN | 65% | 50% | 75% | 25% | 65% |
| Total Inert % = IFN | 35% | 50% | 25% | 75% | 35% |
| PLA:Rebar = DFN/IFN ratio | 2:1 | 1:1 | 3:1 | 1:4 | 2:1 |
| Grieve Temp ° F. | 235 | 235 | 235 | 235 | 235 |
| Mat Shrinkage (width in inches) | 21 to 20 | 21 to 19.5 | 19 to 18.5 | 19 to 19 | 21-18 |
| Target Basis wgt g/m2 | 100-150 | 60-100 | 120-160 | 40-80 | 100-160 |
| Basis wgt range after PLA hydrol. | 33-53 | 30-50 | 30-40 | 30-60 | 35-56 |
| Transport Speed 1 = Basis wgt (g/m2) | 160 | 90 | 157 | 102 | 162 |
| Transport Speed 2 = Basis wgt (g/m2) | 160 | 88 | | 88 | 165 |
| Transport Speed 3 = Basis wgt (g/m2) | 142 | | | 73 | | for mixing and means for heating to a constant temperature of about 70° C. An 8-inch wide×240-inch long PSF substrate as described in Example 2 (Run-4) and Example 3 with 25% PLA fiber and 75% inert fiber content was first passed slowly through a casting bath (similar to FIG. 7, 19b) containing hexane in order to remove residual oils on the material. After drying, the PSF substrate was passed through a second casting bath containing 0.1% Triton X-100 in ethanol and the material was allowed to air dry. Finally, a web transport system was used to move the PSF substrate in roll-form through the heated casting bath containing the agarose solution at 12 inches per minute and with means to insure that the PSF substrate was completely wetted by the casting solution. As the PSF emerges from the casting bath and is slowly moved to a wind-up roller, the agarose solution cools to room temperature and a natural agarose gel is formed. The resulting agarose-gel-PSF IPN substrate was collected in roll-form and stored in a water bath.

Example 5

Preparation of a Porous, Interpenetrating Polymer Network: Cross-Linking and Simultaneous Pore Formation to Create a Macroporous Agarose-Gel-IPN Substrate The water-wet, agarose-gel-PSF material (8×240") from Example 4 was immersed in 200 milliliters of 0.5N sodium hydroxide with 2 milliliters epichlorohydrin.

The mixture was allowed to stand with gentle agitation for two hours at 55° C. The resultant macroporous IPN substrate with cross-linked agarose gel and predesigned pore structure was rinsed with water several times to remove excess reactants and stored in water with 1% ethanol.

Example 6

Permeability and Flux of IPN Agarose-Gel-IPN Substrates

Darcy permeability (k) and flux (Q) for the materials were carried out on samples that had been stored and washed with water. The testing method involved pumping liquid through a sample disk of known diameter and measuring the pressure differential at a constant flow rate. As a standard procedure, a sample disk of diameter 1 1/32" was cut and placed in a 25 millimeter Swin-Lok plastic filter holder (Whatman Corp., p/n 420200). A Waters Corp. Model 625 pump with 50-microliter heads was used for pumping water/ethanol (99:1) through the filter holder and a digital pressure gauge (SSI Technologies Inc. p/n MGI-30-A-9V) was used to measure pressure resulting from various sample disks. Flow rates were typically set at 1.0 ml/min and pressures were allowed to slowly reach a steady state over a period of up to 15 minutes before final readings were made. Pumping was stopped if pressure exceeded 20 psi, flow rate was decreased, and a steady state pressure was established at a lower flow rate when necessary. All experiments were carried out at room temperature and at atmospheric pressure at the permeate outlet. Each measurement was repeated three or more times to achieve a reproducibility of 25%.

The flux, Q, (Kg/m²h), was calculated from the following relationship:

$$Q = R/A$$

where R, is the flow rate passing through the material (typically 0.1 to 1.0 cm³/minute); and A is the active surface area of the material (2 cm²). The hydrodynamic Darcy permeability, k (m²) of the material was calculated from the following equation:

$$k = \eta D / 3600 d \Delta P$$

where $\eta$ is the water viscosity (Pa s), D, is the membrane thickness (m), d, is the water density (Kg m³), and $\Delta P$ (Pa) is the pressure difference at which the flux, Q, was measured Samples from Examples 4 and 5 (Ex4 and Ex5) were tested and results are shown in the table below. Thus, after treating the Example 4 IPN substrate under conditions for the removal of the DFN as described in Example 5 to create a porous IPN substrate, the pressure differential in pounds/inch² (PSIG) was reduced by a factor (X-factor) of 200 and, accordingly, the Darcy permeability was increased by a factor of 200.

| Sample # | Thickness micrometers | Flow Rate cm³/min | Pressure PSIG | Pressure kPa | Flux Kg/m² h | Darcy Permeability m² | X Factor |
|---|---|---|---|---|---|---|---|
| Ex4 | 310 | 1.0 | 20+ | 138 | 1200 | $6.45 \times 10^{-16}$ | 200 |
| Ex5 | 280 | 1.0 | 0.1 | 0.69 | 1200 | $1.29 \times 10^{-13}$ | 1 |

Example 7

Polyacrylamide Casting with a Porogenic Support Fabric and a Common Nonwoven to Form IPN Substrates Fabric-A (Freudenberg Nonwovens, Inc., Hopkinsville, Ky., p/n FO-2465) and Fabric-B (Example 2 (Run-4) after calendering per Example 3) with 25% PLA fiber and 75% inert fiber content were Fabric samples (2×4") were passed through a 0.1% (w/w) solution of Triton X-100 in ethanol. The samples were allowed to air dry, and then placed, for 2 minutes, in a 10% polyacrylamide gel forming solution prepared by mixing 13.2 milliliters of the 30% acrylamide/bisacrylamide solution (30% solution, mix ration 19:1, Sigma p/n A-3449) with 24.7 milliliters water, 2 ml ammonium persulfate solution (100 milligrams per 5 milliliters water, Sigma p/n A3678), and 25 microliters of tetramethylethylenediamine (TEMED, Sigma p/n T22500). The wet fabric was transferred to a glass plate, a sheet of 5 mil thick polyester film (Mylar) was placed on top of the fabric, and another glass plate was placed on top of the film and the sandwich was allowed to stand at room temperature. After 30 minutes, the polymer impregnated fabrics were removed and transferred to a water bath.

Example 8

Preparation of Polyacrylamide Macroporous IPN Substrates and Permeability Tests to Demonstrate Porosity and Pore Formation

Hydraulic pressure of sample IPN disks prepared in according to Example 7 were measured before and after a solvent exchange which included a 1 hour reaction time in methylene chloride (DCM) for the removal of the dispersible fiber network. The solvent exchange was performed by allowing disks to stand for 5 minutes each in the following solvents: water, water/ethanol (1:1), ethanol, ethanol/DCM (1:1), and DCM. Sample disks in the DCM bath were allowed to stand with gentle agitation for 60 minutes and then the reverse solvent exchange was performed to water.

Sample IPN disks (1½2" diameter) from Example 7 were cut and placed in a 25 millimeter Whatman Swin-Lok holder (p/n 420200) for flow-through pressure testing following the method described in Example 6 to measure hydraulic pressure resulting from various sample disks. Darcy permeability and flux were calculated as described in Example 6. Flow rates were set at 0.3 and 0.1 ml/min and pressures were allowed to reach a steady state over a period of up to 15 minutes before a final reading was made. Pumping was stopped when pressure exceeded 20 pounds/inch2 (PSIG) for the A-samples and 32 PSIG for the B-samples. The A-samples were prepared from a common nonwoven without dispersible fiber while the B-samples were from a PSF substrate. As expected, the A-samples without a DFN had the same permeability before and after treatment with solvent and the B-samples containing a PSF with 25% DFN had a 321-fold improvement (X-factor) in Darcy permeability as shown below.

| Sample # | Thickness micrometers | Solvent Exchange | Flow Rate $cm^3$/min | Pressure PSIG | Pressure kPa | Flux (Q) $Kg/m^2 h$ | Darcy Permeability(k) $m^2$ | X Factor |
|---|---|---|---|---|---|---|---|---|
| A1 | 320 | no | 0.3 | 20+ | 138+ | 360 | 2.06E−16 | |
| A2 | 320 | yes | 0.3 | 20+ | 138+ | 360 | 2.06E−16 | |
| B1 | 390 | no | 0.1 | 32+ | 221+ | 120 | 5.24E−17 | 321 |
| B2 | 390 | yes | 0.1 | 0.1 | 0.69 | 120 | 1.68E−14 | 1 |

As shown in the table below, weights of the sample disks were measured for the water wet, blotted disks before (Wgt.1) and after the solvent exchange procedure (Wgt.2). As expected, there was no weight loss after the solvent exchange procedure for the A-sample disks but the B-sample disks lost 24 mg. Also, a blank, dry B disk (57 mg) was placed in methylene chloride and allowed to stand overnight. The weight loss measured for this sample was 23 mg (final weight, 34 mg). Accordingly, the porosity of the B2 sample can be determined from the weight loss as 24 mg/215 mg or 11%.

| Sample # | Wgt. 1 mg | Wgt. 2 mg | Wgt Loss % |
|---|---|---|---|
| A1 | 143 | | |
| A2 | 143 | 143 | 0 |
| B1 | 215 | | |
| B2 | 215 | 191 | 11 |

Example 9

Preparation of an Agarose-Gel-IPN Substrate with Sulfopropyl Groups

The water-wet, cross-linked, IPN material (8"×240") from Example 5 was transferred to a container with 200 milliliters of 1.0N sodium hydroxide and allowed to stand for 30 minutes at room temperature. The material was transferred to a container with 200 milliliters tert-butanol and 20 milliliters of propane sultone. The mixture was allowed to stand with gentle agitation for two hours at 55° C. The resultant interpenetrating polymer network (IPN) substrate with sulfopropyl groups was rinsed with tert-butanol and water several times to remove excess reactants and stored in water with 1% ethanol. The ion exchange capacity was tested spectrophotometrically using pyridine acetate and determined to be 116.6 milliequivalents per milliliter of the agarose-gel-IPN substrate.

Example 10

Preparation of an Agarose-Gel-IPN Substrate with Quaternary Amino (Q) Groups

The water-wet, cross-linked, IPN material (4"×38") from Example 5 was transferred to a container with 100 milliliters of 0.5N sodium hydroxide, allowed to stand for 5 minutes at room temperature, and 100 milliliters of 70% glycidyltrimethylammonium chloride (G-MAC, CAS-No. 3033-77-0, SACHEM Europe B.V., The Netherlands). The mixture was allowed to stand with 0.5 gm $NaBH_4$ with gentle agitation for two hours at 55° C. The resultant interpenetrating polymer network (IPN) substrate with quarternary amino groups was washed with water several times, once with 2M NaCl, and three times with water to remove excess reactants and stored in water with 1% ethanol.

Example 11

Binding of Lysozyme to Sulfopropyl-Functionalized Agarose-Gel-IPN Substrate

Twenty disks (1 centimeter diameter) of the sulfopropyl fun.ctionalized macroporous cross-linked agarose IPN substrate described in Example 9 were immersed in 20 milliliter of buffer A (10 mM sodium phosphate at pH 7.0) containing lysozyme (20 milligrams/milliliter, Scott Laboratories). After 16 hours with gentle mixing at room temperature, the disks were washed 5 times with 15 milliliters of water, 3 times with 10 milliliters of buffer B (10 mM sodium phosphate/500 mM sodium chloride/pH 7.0) and the washes were collected and analyzed for protein concentration at 280 nanometers using a spectrophotometer. The concentration of lysozyme in the washings was measured, and the amount of protein bound to the IPN substrate was calculated based on the volume of the 20 disks. The protein binding capacity was determined to be 66.5 mg/milliliter of IPN substrate.

Example 12

Binding of Human Gamma Globulin (hIgG) to Sulfopropyl-Functionalized Agarose-Gel-IPN Substrate Twenty disks (1 centimeter diameter) of the sulfopropyl functionalized cross-linked agarose-IPN substrate from Example 9 were immersed in 20 milliliters of buffer A (10 mM sodium acetate/pH 5.0) containing human gamma globulin (20 milligrams/milliliter, Sigma Aldrich). After 16 hours with gentle mixing, the disks were washed 5 times with 15 milliliters water. The disks were then washed 3 times with 10 milliliters of buffer B (10 mM sodium phosphate/500 mM sodium chloride/pH 7.0). The washes were collected and analyzed for protein concentration at 280 nanometers using a spectrophotometer. The concentration of hIgG in the washings was measured, and the amount of hIgG bound to the IPN was calculated based on the volume of the 20 disks. The protein binding capacity was determined to be 78.7 mg hIgG/milliliter of IPN substrate.

Example 13

Static and Dynamic Binding of Bovine Serum Albumin (BSA) to Quaternary Aminomethyl-Functionalized Agarose-Gel-IPN Substrate Static binding capacity was determined for the quaternary aminomethyl functionalized cross-linked agarose-IPN substrate from Example 9 using five disks (1 centimeter diameter) which were immersed in 3 milliliters of buffer A (0.10M glycine/pH 9.0) containing bovine serum albumin (BSA, 20 milligrams/milliliter, Sigma Aldrich). After 16 hours with gentle mixing, the disks were washed 5 times with 3 milliliters of Buffer A. The disks were then washed 3 times with 3 milliliters of Buffer B (0.10M glycine/pH 9.0/500 mM sodium chloride). The washes were collected and analyzed for protein concentration at 280 nanometers using a spectrophotometer. The concentration of BSA in the washings was measured, and the amount of BSA bound to the IPN was calculated based on the volume of the 5 disks. The protein binding capacity was determined to be 182 mg BSA/milliliter of IPN substrate.

Dynamic binding capacity of the same quaternary aminomethyl-functionalized, cross-linked agarose-IPN substrate from Example 9 was tested by placing multiple sheets of the Q-Macro-IPN-Agarose in a small device (2.8 ml total volume) which was connected to a Waters M600 pump. Buffer A was pumped through the device at 1.0 mL/minute and absorbance was detected using a Waters 486 detector at 300 nm. Pressure was measured at ~40 psi throughout the run and ~90 psi during delivery of Buffer-B. The device was primed with 20% ethanol and equilibrated in Buffer-A for about two hours at 1 ml/min. As shown in the FIG. 10 chromatogram 300, at 310 (T=1 minute), a solution containing BSA (5 mg/ml in Buffer-A) was switched into the system. At 330 (T=-180minutes) Buffer-A was switched into the system. At 340, (T=~200 minutes) Buffer-B was switched into the system and from T=~205 minutes to T=~220 minutes) the eluted protein 350 was collected (total volume ~14 ml).

Figure 10:
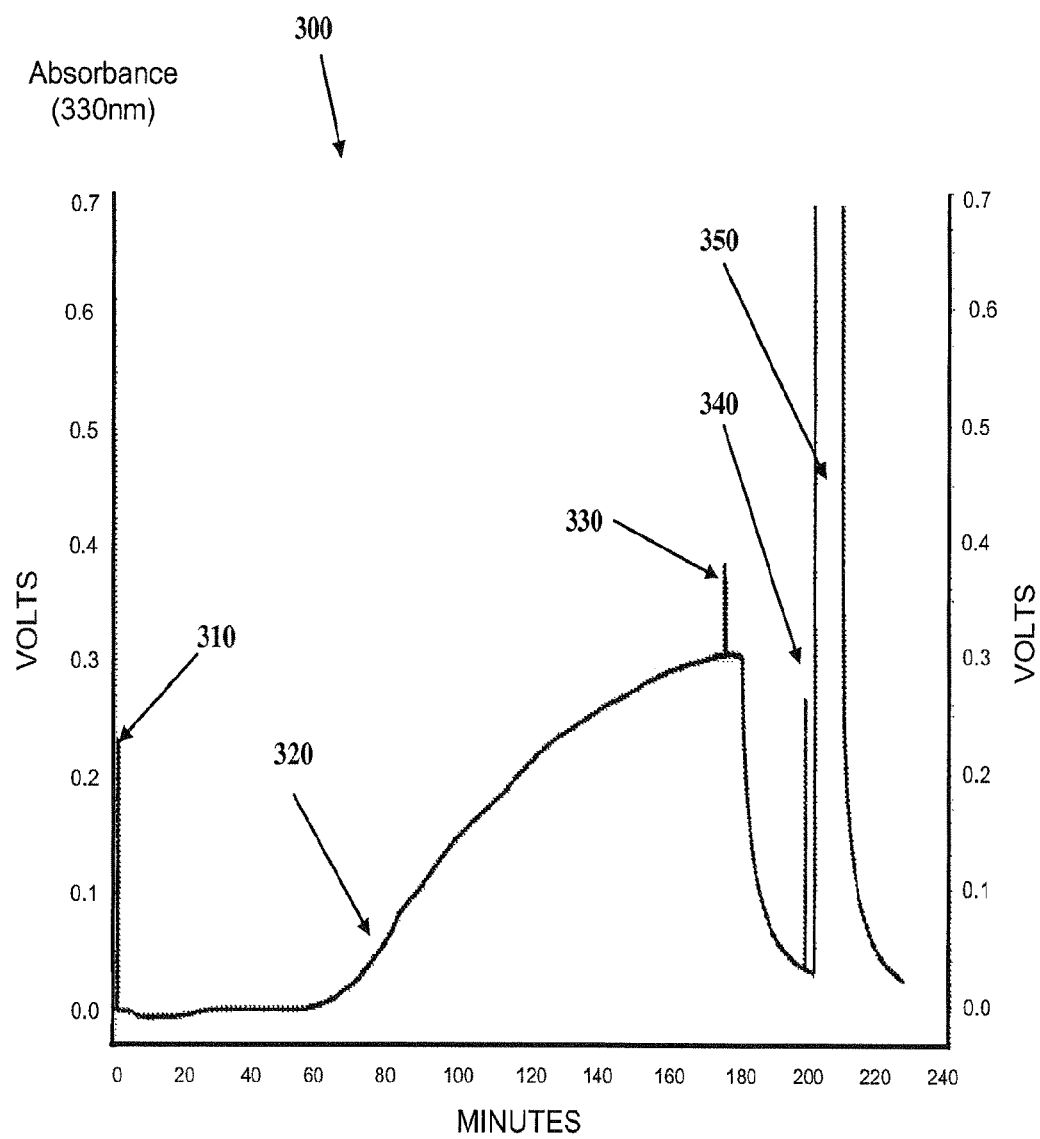
FIG. 10 is a chromatogram showing the result of a chromatography application of the macroporous IPN substrate for the adsorption and capture over time of a protein from a fluid stream and the subsequent release of the adsorbed protein according to one aspect of the invention.

Now referring to FIG. 10, a chart of absorbance at 330 nm versus minutes, the chromatogram shows a 10% breakthrough above the baseline at 320 at which point the dynamic binding capacity of the substrate can be determined for these conditions. Thus, the BSA delivery was initiated at T=1 minute, the system dead volume was ~2.5 ml and the 10% breakthrough at 320 was at ~T=72.5 minutes. Accordingly, the time for BSA delivery through the substrate in the device and to the breakthrough point in the chromatogram was ~69 minutes and thus the total BSA uptake at breakthrough is 345 mg (69 m×1 ml/minutes×5 mg/ml). Accordingly, the dynamic binding capacity=123 mg/ml (345 mg/2.8 ml). The eluted protein 350 was analyzed spectrophometrically and amounted to 535.6 mg (or 192.3 mg/ml=535.6 mg/2.8 ml) in good agreement with the static binding assay done earlier.

Example 14

Preparation of Protein-A Functionalized Agarose-Gel-IPN Affinity Substrate

A 3-step reaction sequence was used to covalently link Protein-A to the macroporous cross-linked agarose IPN substrate described in Example 5. The first step was a condensation reaction with glycidol (2,3-diepoxy-1-propanol) at basic pH to form a diol functionalized substrate (Sundberg and Porath, 1974, J. Chromatography 90, 87-98). Twenty disks of the material from Example 5 (1 centimeter diameter) were suspended in 20 milliliters of 0.3M sodium hydroxide. Glycidol (2 milliliters) and 8 milliliters water was added and after gentle mixing at 50° C. for 1 hour, the disks were washed with five times with 10 ml water and stored at 4° C. in water. The second step was oxidation of the diol to form the aldehyde functionalized IPN (Shainoff, J., 1981 U.S. Pat. No. 4,275, 196; Guisan, J. M., et al., 1987, Methods in Biotechnology 277-287). The 20 disks from the previous reaction were washed 3 times with 20 milliliters water, suspended in 20 milliliters water, and 10 milliliters 0.16M sodium periodate was added. After gentle mixing for 1 hour at room temperature, the disks were washed 3 times with 20 milliliters water and stored at 4° C. in water. The third step was a reductive amination to couple the Protein A to the aldehyde-agarose IPN (Lane, C. F., 1976, Synthesis 3, 135-146; Guisan, J. M., et al., 1989, Enzyme Micro. Technol., 11(6), 353-359). The 20 aldehyde-agarose IPN disks from the previous step were rinsed with water, suspended in 20 milliliters of coupling buffer (200 mM sodium phosphate/pH 7.8) and Protein-A (25 milligrams, Repligen Inc.) was added. After gentle mixing for 30 minutes at room temperature, sodium cyanoborohydride (2M×0.5 milliliters) was added and mixing was continued for 2 hours at room temperature. Finally, excess aldehyde groups were blocked by adding ethanolamine (2M×0.2 milliliters) to the reaction mixture. After mixing for one hour, sodium cyanoborohydride (2M×1.0 milliliters) was added and the reaction mixture was allowed to stand overnight at 4° C. The disks washed repeatedly with water and stored in water with 0.2% sodium azide at 4° C.

Example 15

Use of Protein-A Functionalized Agarose-Gel-IPN Affinity Substrate for Isolation of hIgG A mixture of human gamma globulin (hIgG) (Sigma Aldrich, p/n G-4386) and bovine serum albumin (BSA) (Biocell Labs Inc., p/n 3202-00) was used as a model solution from which hIgG could be purified. Ten disks (1 centimeter diameter) of the macroporous Protein-A agarose IPN substrates from Example 12 were first washed with water and then suspended in a 10 milliliter protein solution (hIgG at 10 milligrams/milliliter, BSA at 20 milligrams/milliliter, in 50 mM TRIS/200 mM NaCl/pH 8.5). The disks were allowed to stand in the protein solution for 1 hour with gentle mixing every 15 minutes. After removing the protein solution, the disks were washed with four times with 10 milliliters of 50 mM TRIS/200 mM NaCl/pH 8.5. The final wash was collected and UV absorbance at 280 nanometers was measured with a spectrophotometer. Next, the disks were washed three times with 10 milliliters of 200 mM glycine/pH 2.0 with each wash being allowed to stand over the submerged disks for 15 minutes with a gentle mixing. These washings were collected, combined, and a protein concentration of 14 milligrams/milliliter of the Protein-A functionalized agarose IPN substrate was determined by UV absorbance at 280 nanometers using an extinction coefficient of 1.23 units equal to 1 milligram/milliliter of hIgG protein. Finally, SDS-PAGE (polyacrylamide gel electrophoresis) was performed under reducing conditions on the eluted fractions to demonstrate that only antibody (hIgG) heavy and light chains were present with no detectable BSA.

Example 16

Freeze Thawing of the Macroporous IPN

Samples from Examples 4 and 5 were frozen in liquid nitrogen, allowed to warm to ambient temperature, and subsequently tested for hydraulic permeability as discussed in Example 6. Thus, after performing the freeze/thaw process on the Example 4 and 5 IPN substrates, the pressure differential in pounds/inch$^2$ (PSIG) was reduced by a factor (X-factor) of 50 and, accordingly, the Darcy permeability was increased by a factor of 50.

Example 17

Freeze Drying of the Macroporous IPN

Samples from Examples 4 and 5 were frozen at −20° C. in a laboratory freezer and dried overnight at high vacuum. These substrates were wetted with water and tested for hydraulic permeability as discussed in Example 6. After performing the freeze drying process on the Example 4 and 5 IPN substrates, the pressure differential in pounds/inch$^2$ (PSIG) was reduced by a factor (X-factor) of 100 and, accordingly, the Darcy permeability was increased by a factor of 100.

Comparative Example 1

Permeability and Pore Structure Comparison to Composite Materials Described in U.S. Pat. No. 7,316,919

FIG. 1 is a figurative representation of the composite materials comprising supported porous gels according to U.S. Pat. No. 7,316,919. This invention describes the preparation of a conventional macroporous composite material prepared by the use of typical porogens which promote phase separation and microgelation during polymerization thereby creating chemical and/or physical modifications of the functional polymer which is supported by an inert matrix. As shown in FIG. 1, the prior art pore structure 16 is primarily round or spherical in shape and there is a wide distribution of pore sizes. In contrast, the engineered macroporous IPN substrates as shown in FIG. 4 have a continuous, cylindrical shaped, interconnected macroporous network 42 produced without the use of conventional porogens, and do not require chemical or physical modifications of the functional polymer. In addition, the pore structure is quantifiable and uniform comprising tubular pores interconnected at crossover points, 43 (FIG. 4).

The Darcy permeability for a typical IPN substrate is $1.29 \times 10^{-13}$ m$^2$ as shown and discussed in Example 6 (Sample Ex5). In contrast, the Darcy permeability of the composite materials of U.S. Pat. No. 7,316,919 is at best $1.58 \times 10^{-15}$ $^{m2}$ (see Example 5 of that patent), or 80 times lower, and therefore, requiring more than 80 times the pressure to achieve the same flow. Based on these Darcy permeabilities, the pressure necessary to pump water or buffer through a typical chromatography column (1 cm diameter×10 cm length) at 1 ml/minute flow rate (or a velocity of ~76 cm/hr) can be calculated. For materials of the present invention, the necessary pressure is 24 psig. Using the most permeable composite materials from U.S. Pat. No. 7,316,919 the pressure is 1,950 psig, which would require expensive hardware such as pumps, columns and tubing capable of withstanding such high pressures.

It is understood that although the embodiments described herein relate specifically to bio-molecular applications, the principles, practice and designs described herein are also useful in other applications, including the manufacture of vaccines and biopharmaceuticals. All literature and similar material cited in this application, including, patents, patent applications, articles, books, treatises, dissertations and web pages, regardless of the format of such literature and similar materials, are expressly incorporated by reference in their entirety. In the event that one or more of the incorporated literature and similar materials differs from or contradicts this application, including defined terms, term usage, described techniques, or the like, this application controls.

The section headings used herein are for organizational purposes only and are not to be construed as limiting the subject matter described in any way. While the present invention has been described in conjunction with various embodiments and examples, it is not intended that the present teachings be limited to such embodiments or examples. On the contrary, the present invention encompasses various alternatives, modifications, and equivalents, as will be appreciated by those of skill in the art. While the teachings have been particularly shown and described with reference to specific illustrative embodiments, it should be understood that various changes in form and detail may be made without departing from the spirit and scope of the teachings. Therefore, all embodiments that come within the scope and spirit of the teachings, and equivalents thereto are claimed. The descriptions and diagrams of the methods of the present teachings should not be read as limited to the described order of elements unless stated to that effect.

The claims should not be read as limited to the described order or elements unless stated to that effect. It should be understood that various changes in form and detail may be made without departing from the scope of the appended claims. Therefore, all embodiments that come within the scope and spirit of the following claims and equivalents thereto are claimed.

What is claimed is:

1. An interpenetrating polymer network (IPN), comprising:
    a first polymer network comprising a partially dissolved fibrous composite;
    a second polymer network interwoven with the partially dissolved fibrous composite;
    wherein the IPN contains an engineered interstitial pore structure with characteristics of the partially dissolved fibrous composite having pores that are substantially cylindrical in shape and interconnected at fiber cross-over points of the partially dissolved fibrous composite throughout the IPN to facilitate uniform permeation of fluids throughout the IPN, and wherein the IPN has engineered mechanical strength characteristics of the first polymer network.

2. The IPN of claim 1, wherein the second polymer network comprises polymerized monomer units.

3. The IPN of claim 1, wherein the second polymer network comprises gelatable polymers.

4. The IPN of claim 3 wherein the IPN has a thickness of from about 50 to about 500 microns and a second polymer network having an average pore size of from about 0.1 nanometers to about 200 nanometers and the gelatable polymers comprise gelatable native agarose.

5. The IPN of claim 1, wherein the engineered pore structure comprises tubular shaped channels having a cross sectional diameter approximately equal to the cross sectional diameter of dissolved fibers in the dissolved fibrous composite of the first polymer network and a length at least approximately the length of the dissolved fibers, the channels permeating the IPN in a substantially lateral direction.

6. The IPN of claim 1, wherein the second polymer network comprises a polysaccharide.

7. The IPN of claim 1, wherein the polymers of the second polymer network are cross linked.

8. The IPN of claim 1, wherein the first polymer network comprises a fibrous composite having a pore size of from about 0.1 to about 200 microns and the fibrous composite further comprises thermoplastic fibers having melt temperatures from about 50 degrees Centigrade to about 250 degrees Centigrade.

9. A method for producing a functional porous permeable interpenetrating polymer network (IPN) comprising:
mixing first and second fibers to form a mixed fiber fabric having predetermined characteristics to provide an engineered porosity and engineered mechanical strength;
forming a porogenic support fabric (PSF) from the mixed fiber fabric;
casting a polymer onto the PSF; and
removing at least a portion of the second fibers to form the porous IPN having the engineered porosity permeability and engineered mechanical strength.

10. The method of claim 9 further comprising treating the porous IPN with functional chemical moieties.

11. The method of claim 9 further comprising the porous IPN with a predetermined adsorbent.

12. The method of claim 9, wherein removing at least a portion of the second fibers comprises removing substantially all of the second fibers.

13. A method for producing a functional porous interpenetrating polymer network (IPN) comprising:
mixing first and second fibers to form a mixed fiber fabric having predetermined characteristics to provide engineered porosity and mechanical strength;
forming a porogenic support fabric (PSF) from the mixed fiber fabric;
casting a polymer onto the PSF, and crosslinking the polymer; and
removing at least a portion of the second fibers to form the porous IPN having engineered porosity and mechanical strength.

14. The method of claim 9, wherein the first fibers comprise inert fibers and the second fibers comprise dispersible fibers.

15. The method of claim 9 further comprising treating the mixed fiber fabric with at least a material comprising at least one chromatographic reagent, thereby forming a separation matrix comprising at least one chromatographic reagent supported by the first and second fibers.

16. The method of claim 15, wherein removing at least a portion of the second fibers comprises treating the mixed fiber fabric having the separation matrix with a solvent effective to at least partially dissolve the second fibers while leaving the first fibers substantially unchanged, and thereby forming a chromatographic medium comprising the separation matrix supported by the first fibers and having pores running therethrough where the second fibers have been at least partially dissolved.

17. A method for producing a functional porous interpenetrating polymer network (IPN) comprising:
mixing first and second fibers to form a mixed fiber fabric having predetermined characteristics to provide engineered porosity and mechanical strength;
forming a porogenic support fabric (PSF) from the mixed fiber fabric, wherein forming the PSF from the mixed fiber fabric comprises using one of a wet laid and an airlaid process;
casting a polymer onto the PSF; and
removing at least a portion of the second fibers to form the porous IPN having engineered porosity and mechanical strength.

18. A method for producing a functional porous interpenetrating polymer network (IPN) comprising:
mixing first and second fibers to form a mixed fiber fabric having predetermined characteristics to provide an engineered porosity and mechanical strength;
forming a porogenic support fabric (PSF) from the mixed fiber fabric;
casting a polymer onto the PSF; and
removing at least a portion of the second fibers to form the porous IPN having engineered porosity and mechanical strength; and
treating the porous IPN by one of freeze-thawing and freeze-drying.

19. A porogenic support fabric material comprising:
a mixed bed fibrous composite comprising an inert fiber network and a dispersible fiber network, the mixed bed fibrous composite having mechanical strength for casting a second polymer network thereon to generate an interpenetrating polymer network (IPN).

20. The material of claim 19, wherein the material is at least one of:
a sheet;
a fabric; and
a monolith.

21. The material of claim 19, wherein the dispersible fiber network comprises polylactic acid (PLA) and the inert fiber network and the dispersible fiber network are combined in a wet-laid process.

22. A method for producing a functional porous interpenetrating polymer network (IPN) comprising: mixing first and second fibers to form a mixed fiber fabric having predetermined characteristics to provide an engineered porosity and engineered mechanical strength; forming a porogenic support fabric (PSF) from the mixed fiber fabric wherein forming the porogenic support fabric further comprises calendaring to produce inter-fiber contact and bonding at fiber cross-over points; casting a polymer onto the PSF; and removing at least a portion of the second fibers to form a porous IPN having the engineered porosity and engineered mechanical strength.

* * * * *